United States Patent
Ohnuma et al.

(10) Patent No.: US 8,266,654 B2
(45) Date of Patent: Sep. 11, 2012

(54) INFORMATION PROCESSING SYSTEM, INFORMATION PROCESSING APPARATUS AND METHOD, RECORDING MEDIUM AND PROGRAM

(75) Inventors: Kensuke Ohnuma, Tokyo (JP); Hitoshi Kimura, Kanagawa (JP)

(73) Assignee: Sony Corporation (JP)

( * ) Notice: Subject to any disclaimer, the term of this patent is extended or adjusted under 35 U.S.C. 154(b) by 1239 days.

(21) Appl. No.: 10/493,189

(22) PCT Filed: Aug. 20, 2003

(86) PCT No.: PCT/JP03/10485
§ 371 (c)(1),
(2), (4) Date: Oct. 21, 2004

(87) PCT Pub. No.: WO2004/019610
PCT Pub. Date: Mar. 4, 2004

(65) Prior Publication Data
US 2005/0060743 A1      Mar. 17, 2005

(30) Foreign Application Priority Data
Aug. 21, 2002  (JP) ............................... P2002-240753

(51) Int. Cl.
*G06F 3/00* (2006.01)
(52) U.S. Cl. .......................................... 725/46; 725/100
(58) Field of Classification Search .................. None
See application file for complete search history.

(56) References Cited

U.S. PATENT DOCUMENTS

| | | | |
|---|---|---|---|
| 6,460,036 B1 * | 10/2002 | Herz | 707/748 |
| 6,651,253 B2 * | 11/2003 | Dudkiewicz et al. | 725/114 |
| 2002/0011988 A1 | 1/2002 | Sai et al. | |
| 2002/0083441 A1 * | 6/2002 | Flickinger et al. | 725/32 |
| 2003/0037068 A1 * | 2/2003 | Thomas et al. | 707/200 |
| 2003/0131355 A1 * | 7/2003 | Berenson et al. | 725/46 |
| 2008/0189743 A1 * | 8/2008 | Ellis et al. | 725/39 |

FOREIGN PATENT DOCUMENTS

| | | |
|---|---|---|
| JP | 11-134345 A1 | 5/1999 |
| JP | 11-345446 A1 | 12/1999 |
| JP | 2000-13708 A1 | 1/2000 |
| JP | 2000-057090 A | 2/2000 |
| JP | 2000-287189 A1 | 10/2000 |
| JP | 2001-86420 A1 | 3/2001 |
| JP | 2001-125858 A | 5/2001 |
| JP | 2001-136452 A1 | 5/2001 |
| JP | 2001-160940 A1 | 6/2001 |
| JP | 2001-298677 A1 | 10/2001 |
| JP | 2002-44555 A1 | 2/2002 |

* cited by examiner

*Primary Examiner* — Brian Pendleton
*Assistant Examiner* — Olugbenga Idowu
(74) *Attorney, Agent, or Firm* — Lerner, David, Littenberg, Krumholz & Mentlik, LLP

(57) ABSTRACT

An information processing system and method are adapted to swiftly record a program matched to preference information. A user apparatus registers generated preference information, together with information representative of destinations for its preference information, to a server through a network. The server, when registered with the preference information, notifies another user apparatus as a destination of the preference information. The video recording/reproducing unit of the another user apparatus accesses the server through the network and designates preference information desired for scheduling of recording. The server sends the designated preference information to the video recording/reproducing unit through the network. The video recording/reproducing unit receives the preference information and carries out scheduling for recording on the basis of the preference information. The invention is applicable to a hard-disk video recorder.

26 Claims, 19 Drawing Sheets

FIG. 7

```
<user_profile updateTime="2001.12.31 23:59:56">
<preference>

<keyword_list allowAutoUpdate="true">
<keyword name="YAMADA ICHIRO" update="2002.1.3 10:03:45">30</keyword>
<keyword name="TANAKA HANAKO" update="2002.1.3 10:03:45">20</keyword>
<keyword name="BASEBALL" update="2002.1.3 10:03:45">10</keyword>
<keyword name="SUNDAY THEATER" update="2002.1.3 10:03:45">25</keyword>
</keyword_list>

<genre_list allowAutoUpdate="true">
<genre id="1" update="2002.1.3 10:03:45">23</genre >
<genre id="3" update="2002.1.3 10:03:45">—10</genre >
</genre_list>

<station_list allowAutoUpdate="true">
<station id="1" update="2002.1.3 10:03:45">23</station>
<station id="5" update="2002.1.3 10:03:45">—10</station>
</station_list>

<time_zone_list allowAutoUpdate="true">
<time_zone id="0" update="2002.1.3 10:03:45">50</time_zone>
<time_zone id="2" update="2002.1.3 10:03:45">—10</time_zone>
<time_zone id="4" update="2002.1.3 10:03:45">—20</time_zone>
<time_zone id="8" update="2002.1.3 10:03:45">23</time_zone>
</time_zone_list>

</preference>
</user_profile>
```

401 (entire block)
402 (keyword_list) 403 (genre_list) 404 (station_list) 405 (time_zone_list)

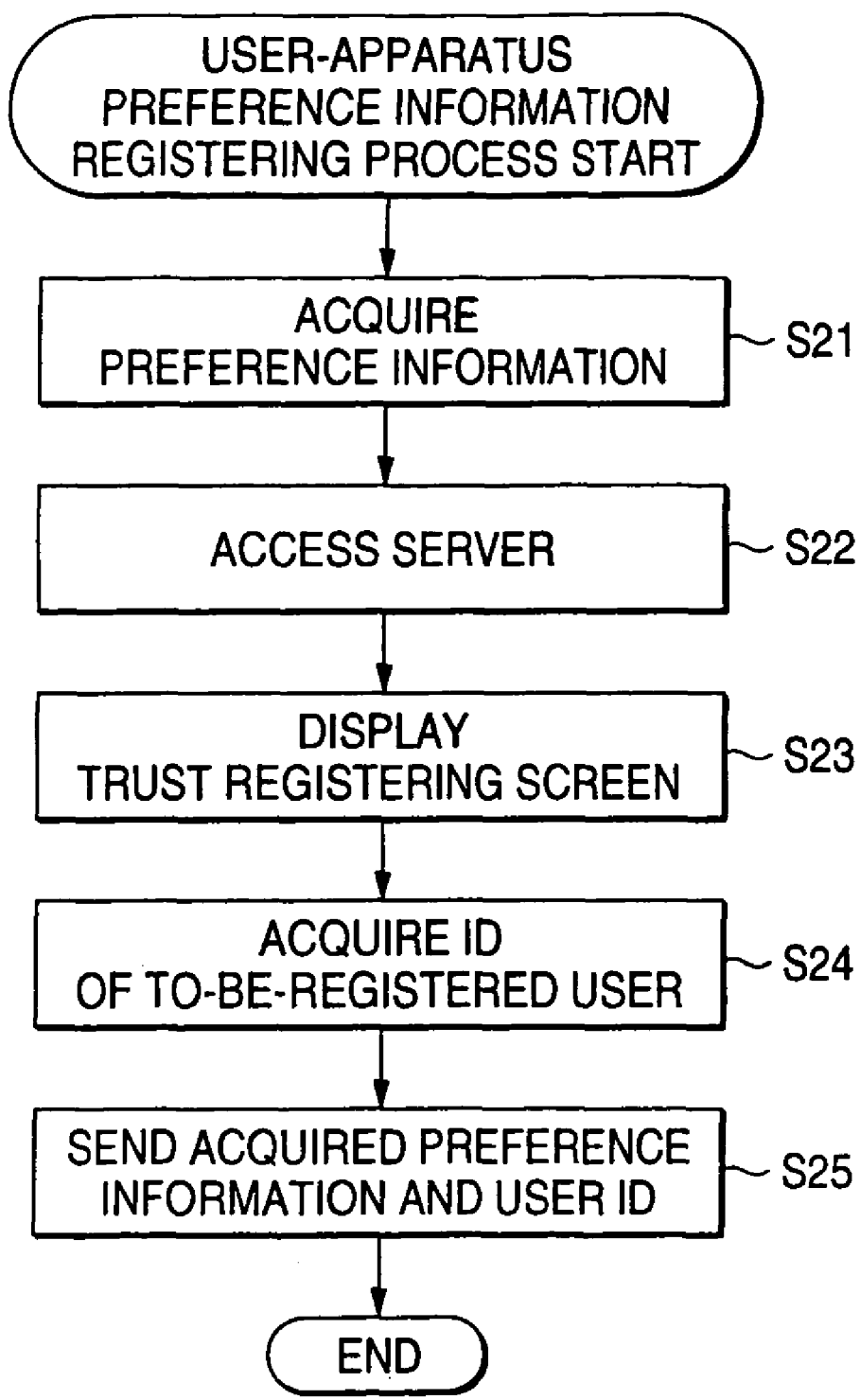

FIG. 17

| BROADCAST PROGRAM INFORMATION ||
|---|---|
| BROADCAST STATION | TV JAPAN |
| BROADCAST DATA | 2002/3/26 |
| START TIME | 17:00 |
| END TIME | 18:00 |
| GENRE | VARIETY |
| TITLE | NEWS 17 |
| DETAILED INFORMATION | PREMIER RESIGNED YEN'S DEPRECIATION INCHING |
| ⋮ | ⋮ |

FIG. 18

| RECORDING SCHEDULE LIST | | | | |
|---|---|---|---|---|
| NO. | AIRING DATE | BROADCAST STATION | AIRING START TIME | AIRING END TIME |
| 1 | JULY 1, 2002 | TV JAPAN | 16:00:00 | 16:30:00 |
| 2 | JULY 1, 2002 | NHH | 17:30:00 | 18:30:00 |
| 3 | JULY 1, 2002 | ABC | 19:20:00 | 19:40:00 |
| 4 | JULY 1, 2002 | BBB | 21:00:00 | 21:10:00 |
| 5 | JULY 2, 2002 | TVV | 13:00:00 | 15:00:00 |
| 6 | JULY 2, 2002 | TVV | 15:00:00 | 16:30:00 |
| 7 | | | | |
| 8 | | | | |
| 9 | | | | |
| 10 | | | | |

INFORMATION PROCESSING SYSTEM, INFORMATION PROCESSING APPARATUS AND METHOD, RECORDING MEDIUM AND PROGRAM

CROSS-REFERENCE TO RELATED APPLICATIONS

The present application is a national stage application under 35 U.S.C. §371 of International Application No. PCT/JP2003/010485, filed Aug. 20, 2003, which claims priority from Japanese Application No. P2002-240753, filed Aug. 21, 2002, the disclosures of which are hereby incorporated by reference herein.

BACKGROUND OF THE INVENTION

The present invention relates to an information processing system, information processing apparatus and method, recording medium and program, and more particularly to an information processing system, information processing apparatus and method, recording medium and program adapted to obtain preference information easily and swiftly.

It has been conventionally proposed to automatically picture-record a program (televised program) thought of as the taste of a user by the use of the user's preference information (e.g., see Patent documents 1 to 7).

In the inventions described in these Patent Documents 1 to 7, the preference of a user is analyzed from the history of televised programs actually viewed by the user, to automatically record the programs according to the user's taste:

[Patent Document 1]
JP-A-11-134345
[Patent Document 2]
JP-A-11-345446
[Patent Document 3]
JP-A-2000-13708
[Patent Document 4]
JP-A-2000-287189
[Patent Document 5]
JP-A-2001-160940
[Patent Document 6]
JP-A-2001-298677
[Patent Document 7]
JP-A-2001-86420

However, the inventions described in the Patent Documents 1 to 7 involve the problem that it takes time in getting the user's preference information. As a result, there is a problem that the program according to the user's taste could not be swiftly picture-recorded by scheduling.

Meanwhile, no considerations have been made as to the exchange of preference information between users.

SUMMARY OF THE INVENTION

The present invention, made in view of such situations, aims at making it possible to swiftly picture-record, by scheduling, a program met with preference information.

The information processing system of the present invention includes a first information processing apparatus; a second information processing apparatus operable to exchange information with the first information processing apparatus; and a third information processing apparatus operable to control information exchange between the first information processing apparatus and the second information processing apparatus; the first, second and third information processing apparatuses being connected to a network; the first information processing apparatus including acquiring means for acquiring preference information about a to-be-aired program based on a preference of a user of the first information processing apparatus; and first transmitting means for sending to the third information processing apparatus the preference information and a destination to which the preference information is to be provided; the second information processing apparatus including receiving means for receiving the preference information from the third information processing apparatus; the third information processing apparatus including registering means for registering the preference information sent by the first information processing apparatus; and second transmitting means for sending the registered preference information to the second information processing apparatus when the second information processing apparatus is the destination to which the preference information is to be provided.

The first information processing method of the invention is for an information processing system including a first information processing apparatus, a second information processing apparatus operable to exchange information with the first information processing apparatus and a third information processing apparatus operable to control information exchange between the first information processing apparatus and the second information processing apparatus, the first, second and third information processing apparatuses being connected to a network, the information processing method including acquiring in the first information processing apparatus preference information about a to-be-aired program based on a preference of a user of the first information processing apparatus; sending the preference information and a destination to which the preference information is to be provided from the first information processing apparatus to the third information processing apparatus; registering in the third information processing apparatus the preference information sent from the first information processing apparatus; and sending the registered preference information from the third information processing apparatus to the second information processing apparatus when the second information processing apparatus is the destination; and receiving in the second information processing apparatus the preference information sent by the third information processing apparatus.

The first information processing apparatus of the invention includes first acquiring means for acquiring preference information about a to-be-aired program based on a preference of a user; second acquiring means for acquiring destination information specifying a destination to which the preference information is to be provided; and providing means for providing the preference information and the destination information to another information processing apparatus.

The providing means sends and registers the preference information and the destination information to a first other information processing apparatus and causes the first other information processing apparatus to provide the preference information to a second other information processing apparatus defined by the destination information.

The first acquiring means may start to acquire the preference information about the to-be-aired program based upon a user operation representing a preference for a predetermined program.

The user operation may be an operation to schedule recording or protection of the predetermined program.

The first acquiring means may acquire as the preference information of a preference keyword, genre, airing time zone and broadcast station extracted from broadcast program information of the predetermined program based upon the user operation.

The information processing apparatus may further include receiving means for receiving the broadcast program information from a broadcast station through a broadcast radio wave or from a server.

The second acquiring means may acquire the destination information in plurality.

The second information processing method of the invention includes acquiring preference information about a to-be-aired program based on a preference of a user; acquiring destination information specifying a destination to which the preference information is to be provided; and providing the preference information and the destination information to another information processing apparatus.

A recording medium of the invention is recorded with a program for causing an information processing apparatus to execute an information processing method, the method including acquiring preference information about a to-be-aired program based on a preference of a user; acquiring destination information specifying a destination to which the preference information is to be provided; and providing the preference information and the destination information to another information processing apparatus.

The second information processing apparatus of the invention includes access means for accessing another information processing apparatus; receiving means for receiving preference information about a to-be-aired program from the another information processing apparatus; storage means for storing the received preference information; and scheduling means for scheduling recording of the program based on the stored preference information.

The second information processing apparatus may further include first acquiring means for acquiring designation information for designating a predetermined piece of preference information from a plurality of pieces of the preference information received from the another information processing apparatus; and transmitting means for sending the designation information to the another information processing apparatus; whereby the receiving means receives the preference information corresponding to the designation information from the another information processing apparatus, and the storage means stores the preference information corresponding to the designation information.

The third information processing method of the invention includes accessing another information processing apparatus; receiving preference information about a to-be-aired program from the another information processing apparatus; storing the received preference information; and scheduling recording of the program based on the stored preference information.

The second recording medium of the invention is recorded with a program for causing an information processing apparatus to execute an information processing method, the method including accessing another information processing apparatus; receiving preference information about a to-be-aired program from the another information processing apparatus; storing the received preference information; and scheduling recording of the program based on the stored preference information.

The third information processing apparatus of the invention includes first accepting means for accepting an access by a first other information processing apparatus; receiving means for receiving from the first other information processing apparatus preference information about a to-be-aired program and destination information specifying a destination to which the preference information is to be provided; registering means for registering the preference information and the destination information; second accepting means for accepting an access by a second other information processing apparatus; determining means for determining whether the second information processing apparatus is the destination to which the preference information is to be provided; and first transmitting means for sending the registered preference information to the second information processing apparatus when the determining means has determined that the second other information processing apparatus is the destination to which the preference information is to be provided.

The third information processing apparatus may further include acquiring means for acquiring, from the second other information processing apparatus, designation information for designating a predetermined piece of preference information from a plurality of pieces of the preference information sent by the first transmitting means; and second transmitting means for sending the preference information corresponding to the designation information to the second information processing apparatus.

The fourth information processing method of the invention includes accepting an access by a first other information processing apparatus; receiving from the first other information processing apparatus preference information about a to-be-aired program and destination information specifying a destination to which the preference information is to be provided; registering the preference information and the destination information; accepting an access by a second other information processing apparatus; determining whether the second information processing apparatus is the destination to which the preference information is to be provided; and sending the registered preference information to the second other information processing apparatus when the determining step has determined that the second other information processing apparatus is the destination to which the preference information is to be provided.

The third recording medium of the invention is recorded with a program for causing an information processing apparatus to execute an information processing method, the method including accepting an access by a first other information processing apparatus; receiving from the first information processing apparatus preference information about a to-be-aired program and destination information specifying a destination to which the preference information is to be provided; registering the preference information and the destination information; accepting an access by the second other information processing apparatus; determining whether the second information processing apparatus is the destination to which the preference information is to be provided; and sending the registered preference information to a second other information processing apparatus when the determining step has determined that the second other information processing apparatus is the destination to which the preference information is to be provided.

In the first invention, the preference information about a to-be-aired program is acquired based on a user's preference. Together with the preference information, a destination to which the preference information is to be provided is sent to and registered in the third information processing apparatus. Meanwhile, when the second information processing apparatus is the destination to which the preference information is to be provided, the preference information registered in the third information processing apparatus is sent to the second information processing apparatus through the network.

In the second invention, preference information about a to-be-aired program is acquired based on a user's preference and destination information is acquired specifying a destination to which the preference information is to be provided. The preference information and destination information are provided to another information processing apparatus.

In the third invention, preference information about a to-be-aired program is received and stored from another information processing apparatus through the network. Based on the stored preference information, the program is picture-recorded by scheduling.

In the fourth invention, preference information about a to-be-aired program sent from the first other information processing apparatus and destination information specifying a destination to which the preference information is to be provided are received and registered. Meanwhile, when the second information processing apparatus whose access has been accepted is determined to be a destination to which the preference information is to be provided, the registered preference information is sent to the second information processing apparatus through the network.

BRIEF DESCRIPTION OF THE DRAWINGS

FIG. 7 is a figure showing an example of preference information.

FIG. 8 is a flowchart explaining a process of registering the preference information in a user apparatus of FIG. 1.

FIG. 17 is a figure showing an example of broadcast program information.

FIG. 18 is a figure showing an example of a recording schedule list.

DETAILED DESCRIPTION

Figure 1:
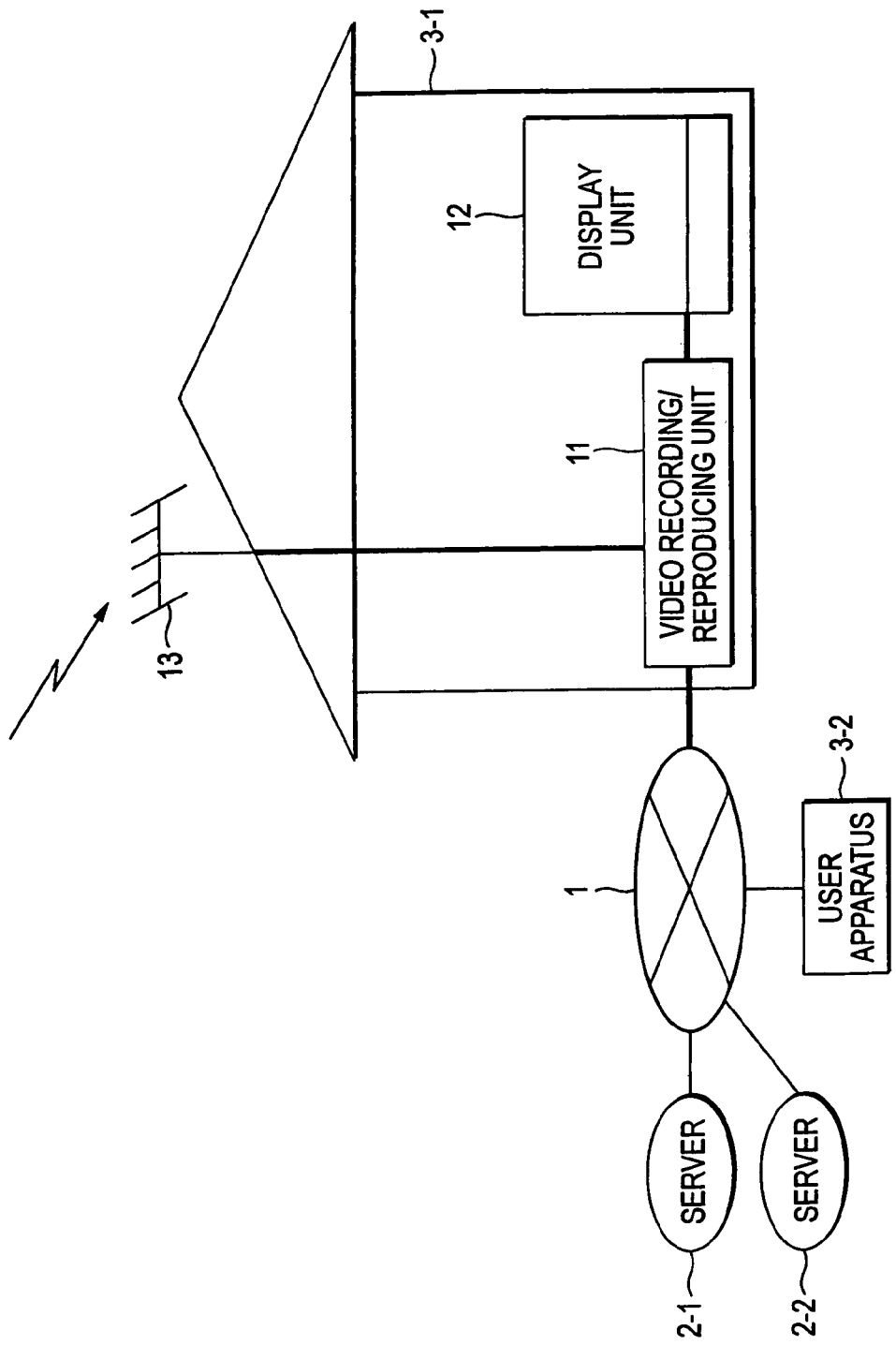
FIG. 1 is a diagram showing a configuration example of a network system to which the present invention is applied.

FIG. 1 represents a configuration example of a network system to which the present invention is applied. In this configuration example, servers 2-1, 2-2 and user apparatuses 3-1, 3-2 are connected to a network 1 configured by the Internet, a WAN (Wide Area Network), a LAN (Local Area Network) or the like. In the FIG. 1 example, although two servers 2-1, 2-2 (hereinafter, referred merely to as a server 2, where there is no need to individually distinguish these servers) and two user apparatuses 3-1, 3-2 (hereinafter, referred merely to as a user apparatus 3, where there is no need to individually distinguish these servers) are connected to the network 1, the number of these is arbitrary and may be three or more, respectively.

The server 2-1 provides preference information (preference information 401, hereinafter referred to in FIG. 7) and the server 2-2 provides broadcast program information (EPG (Electric Program Guide) information), respectively, to the user apparatus 3 through the network 1.

The user apparatus 3 is arranged within a user's household. The user apparatus 3-1 is configured by a video recording/reproducing unit 11, a display unit 12 and an antenna 13.

The video recording/reproducing unit 11, e.g., a hard-disk video-recorder, receives a broadcast wave through the antenna 13, and stores a signal obtained by demodulation to an auxiliary storage device 40 incorporated therein (see FIG. 2) and provides it to the rear-staged display unit 12 in order to make a display thereon. The display unit 12 is a television receiver or a monitor, for example.

Incidentally, although not shown, the user apparatus 3-2 also is configured similarly to the user apparatus 3-1.

Figure 2:
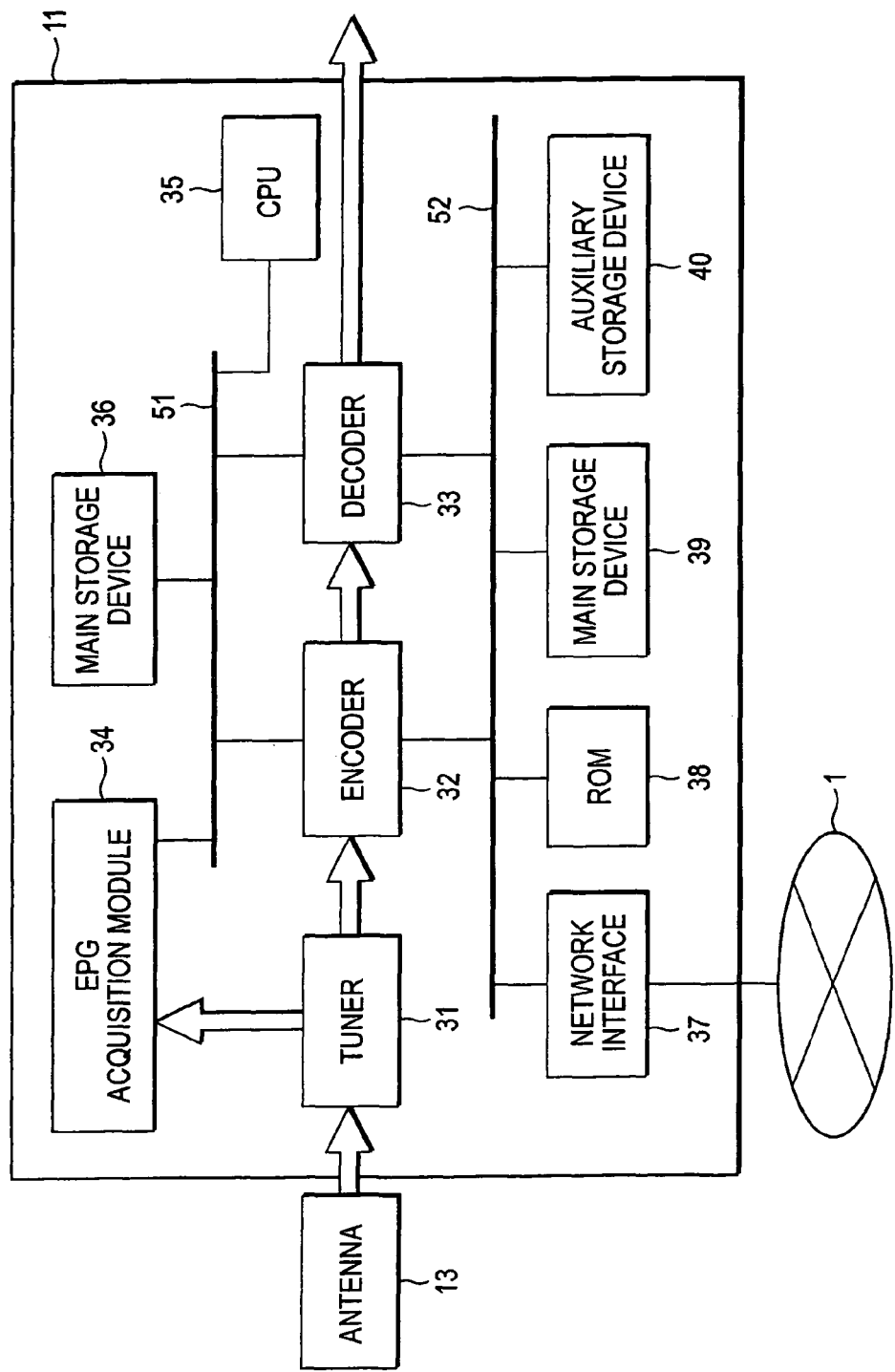
FIG. 2 is a block diagram showing a configuration example of a video recording/reproducing unit of FIG. 1.

The video recording/reproducing unit 11 is configured as shown in FIG. 2, for example. A tuner 31 demodulates a broadcast signal corresponding to a received broadcast wave of terrestrial-wave television broadcast, and outputs a video signal component and an audio signal component to an encoder 32. In the terrestrial-wave television broadcast signal received by the antenna 13, there is included EPG information in the vertical blanking period thereof. The tuner 31 outputs the EPG information to an EPG acquisition module 34.

The encoder 32 encodes the video and audio signal inputted from the tuner 31 under the MPEG (Moving Picture Experts Group) scheme, for example, and supplies and stores it to the auxiliary storage device 40 through a bus 52. The auxiliary storage device 40 is configured by a hard disk, a magnetic tape, a removable disk, a flash memory or the like.

The video and audio signal stored in the auxiliary storage device 40 is outputted through the bus 52 to a decoder 33 where it is decoded under the MPEG scheme and then supplied to the display unit 12. The encoder 32 and decoder 33, in the case a received video and audio signal is not stored in the auxiliary storage device 40, outputs a signal from the tuner 31 directly to the display unit 12.

The bus 52 is connected to a main storage device 39, e.g., a RAM (Random Access Memory), and to a ROM (Read Only Memory) 38. The data and parameters required for the CPU (Central Processing Unit) 35 to carry out various processes are stored in the main storage device 39. The ROM 38 has stored therein the program the CPU 35 is to execute.

The bus 52 is further connected to a network interface 37 for supplying an interface to the network 1.

The CPU 35 is connected to a bus 51, together with the encoder 32, decoder 33 and EPG acquisition module 34. This bus 51 is also connected to a main storage device 36 configured by a RAM or the like.

Figure 3:
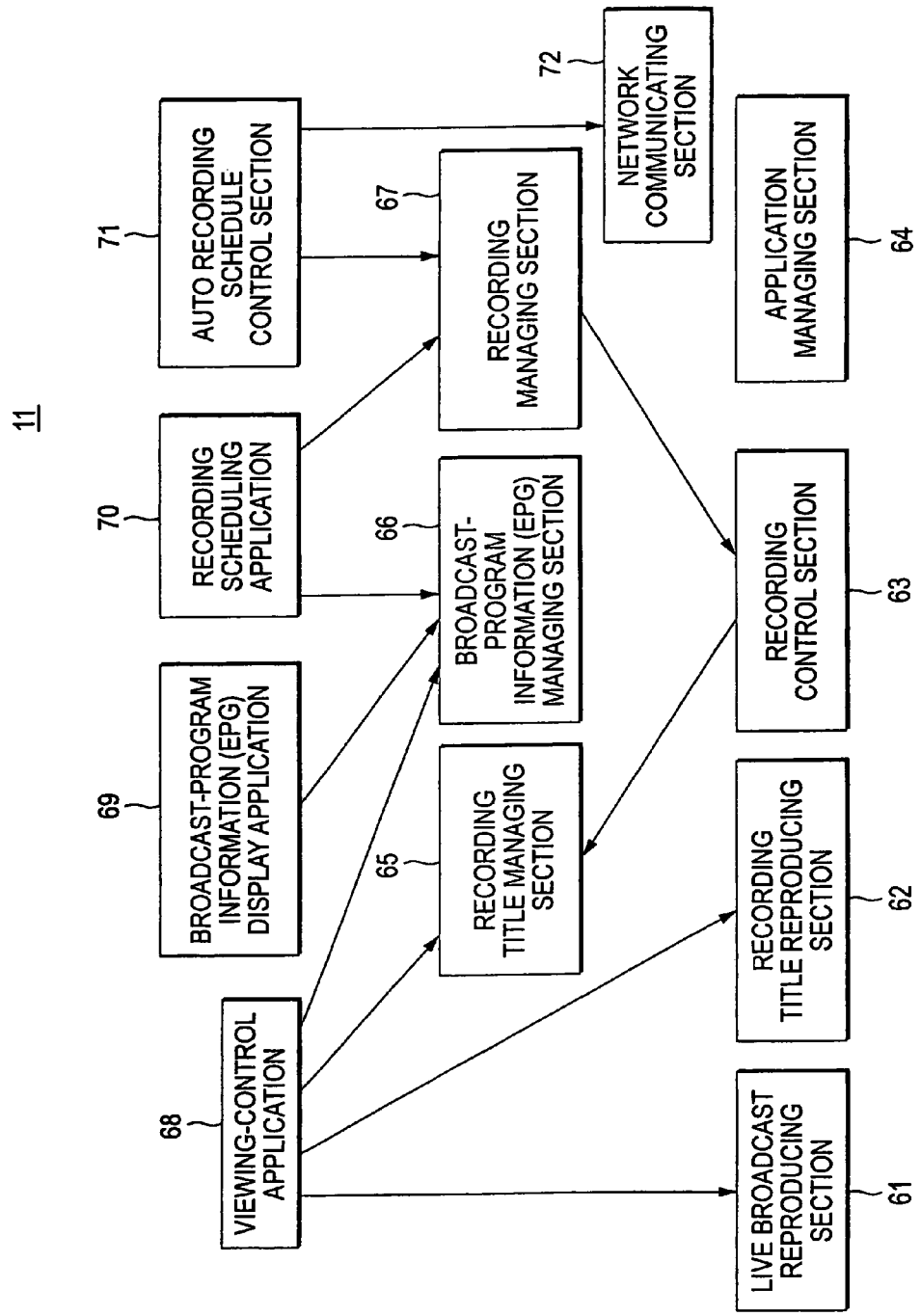
FIG. 3 is a block diagram showing a functional configuration of the video recording/reproducing unit of FIG. 1.

The video recording/reproducing unit 11 has a functional configuration centered on software, as shown in FIG. 3. A live-broadcast reproducing section 61 processes a signal being received at that time by the tuner 31 or a signal inputted from a not-shown external input terminal. A recording title reproducing section 62 carries out a reproducing process of a program (title) stored in the auxiliary storage device 40. The recording control section 63 executes a recording process of signals to the auxiliary storage device 40. An application managing section 64 executes a monitoring process in a start-up, end and operating state of a viewing-control application 68, a broadcast-program information display application 69 and a recording scheduling application 70.

The viewing-control application 68 takes control of the live-broadcast reproducing section 61, recording title reproducing section 62, recording title managing section 65 or broadcast-program information managing section 66, on the basis of an instruction from a user, to reproduce a signal being received or inputted at that time or to reproduce a program stored in the auxiliary storage device 40. Meanwhile, the viewing-control application 68 controls the live-broadcast reproducing section 61, and appropriately looks up the broadcast program information stored in the broadcast program information managing section 66 when causing the tuner 31 to receive a broadcast program of a channel designated by the user. Furthermore, the viewing-control application 68 takes control of the recording title reproducing section 62, and appropriately looks up the program management information stored in the recording title managing section 65 when reproducing a program stored in the auxiliary storage device 40.

The broadcast-program information display application 69 looks up the broadcast program information (EPG information) stored in the broadcast-program information managing section 66, and causes the display unit 12 to display the broadcast-program information. The recording scheduling application 70 executes a recording scheduling process and generates the user's preference information (preference information about broadcast programs) on the basis of an instruction from the user. At this time, the recording scheduling application 70 looks up the broadcast program information stored in the broadcast-program managing section 66, as required. Meanwhile, the recording scheduling application 70, when recording is scheduled on the basis of an operation from the user, takes control of the recording schedule managing section 67 to execute a recording scheduling process.

The recording title managing section 65 manages the information about programs (titles) stored in the auxiliary storage device 40. The broadcast-program information managing section 66 manages the broadcast program information acquired by the EPG acquisition module 34. The recording schedule managing section 67 takes control of the recording control section 63 and executes a recording scheduling process on the basis of a request from the program-recording scheduling application 70 or the auto picture-recoding schedule control section 71.

The auto picture-recoding schedule control section 71 carries out a recording scheduling process on the basis of the preference information (preference information 401 in FIG. 7) acquired from the server 2-1. The network communicating section 72 communicates with the servers 2-1, 2-2 through the network 1 to acquire the preference information and the broadcast program information.

Figure 4:
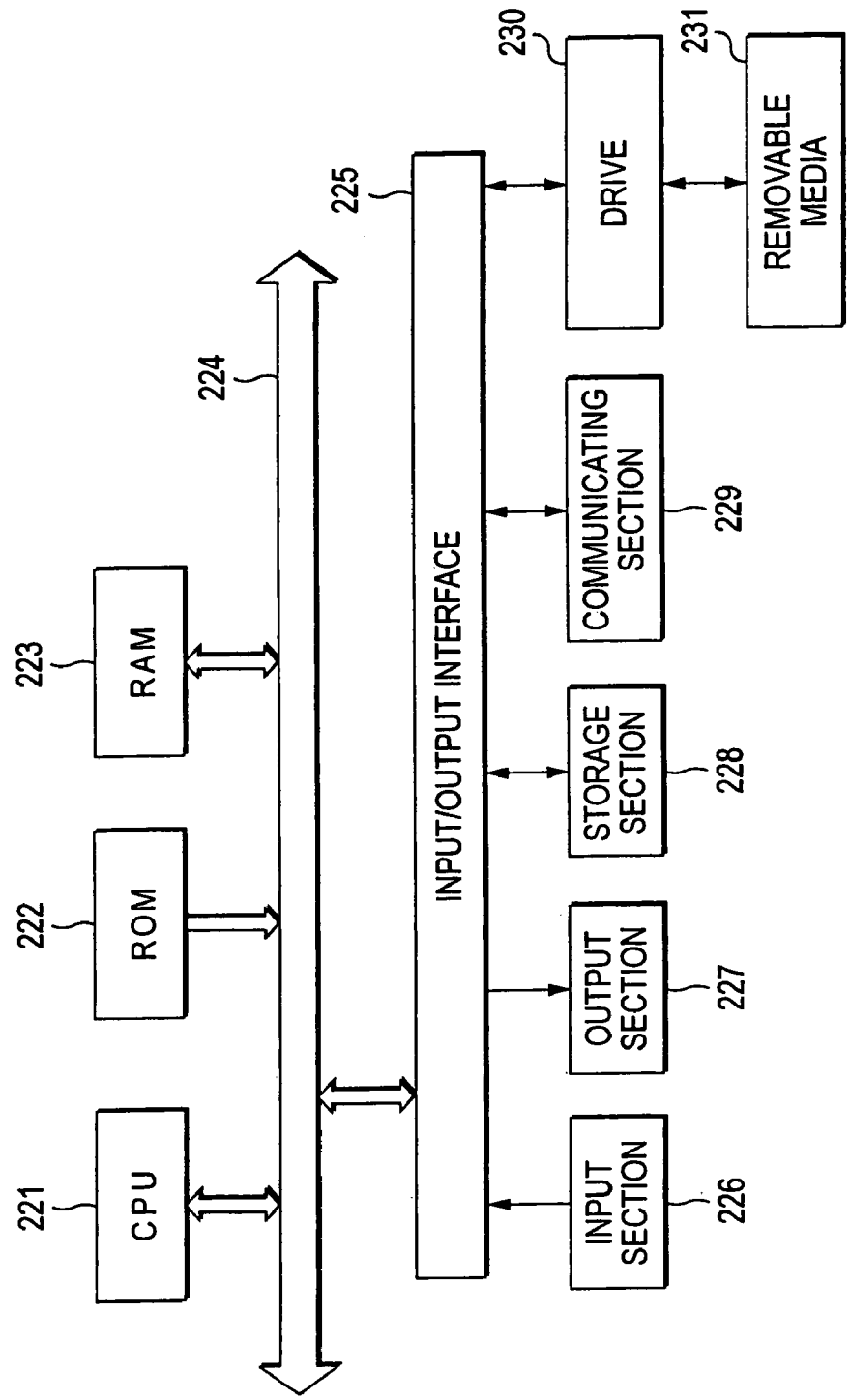
FIG. 4 is a block diagram showing a configuration example of a server 2-1 of FIG. 1.

The server 2-1 is configured as shown in FIG. 4, for example. In FIG. 4, a CPU (Central Processing Unit) 221 carries out various processes according to a program stored in a ROM (Read Only Memory) 222 or a program loaded from a storage section 228 to a RAM (Random Access Memory) 223. Suitably stored to the RAM 223 is the data required for the CPU 221 to execute various processes.

The CPU 221, the ROM 222 and the RAM 223 are mutually connected through a bus 224. This bus 224 is also connected to an input/output interface 225.

The input/output interface 225 is connected to an input section 226 configured by a keyboard, a mouse or the like, an output section 227 configured by a display, such as a CRT (Cathode Ray Tube) or an LCD (Liquid Crystal Display), as well as a speaker, a storage section 228 configured by a hard disk or the like, and a communicating section 229 configured by a modem or the like. The storage section 228 stores preference information (preference information 401 in FIG. 7) to be provided to the user apparatus 3. The communicating section 229 implements a communication process through the network 1, including the Internet.

The input/output interface 225 is also connected to a drive 230, as required, to be suitably loaded with a removable media 231, such as a magnetic disk, an optical disk, a magnetooptical disk or a semiconductor memory. A computer program read therefrom is installed in the storage section 228, as required.

Incidentally, although not shown, the server 2-2 is basically similar in configuration to the server 2-1 shown in FIG. 4.

Figure 5:
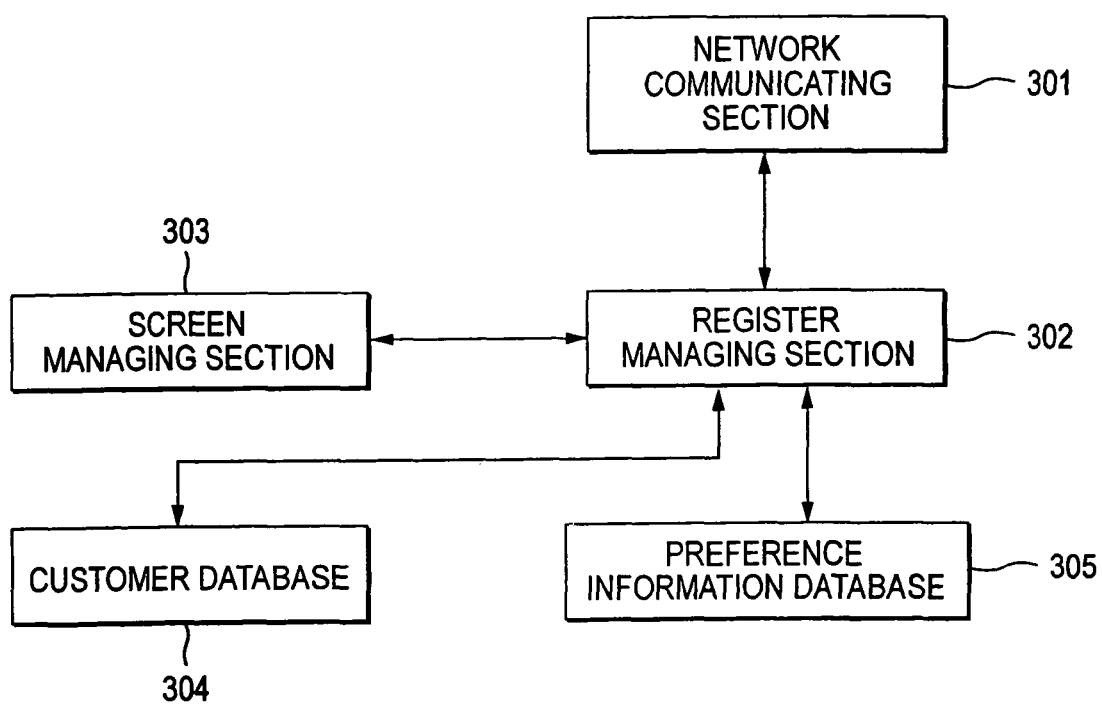
FIG. 5 is a block diagram showing a functional configuration of the server 2-1 of FIG. 1.

FIG. 5 is a block diagram showing a functional configuration of the server 2-1.

A network communicating section 301 communicates with the user apparatus 3 through the network 1, to supply it with preference information. Also, it receives the preference information sent from the user apparatus 3 and the user ID sent from the user apparatus 3, through the network 1.

A register managing section 302 stores the information acquired through the network communicating section 301 to a customer database 304 or a preference information database 305, and acquires the information stored in the customer database 304 or the preference information database 305, outputting it through the network communicating section 301. Meanwhile, the register managing section 302 registers the user ID acquired from the user apparatus 3 through the network communication section 301. A screen managing section 303 manages a trust registering screen (see FIG. 9) on the basis of the user ID under management of the register managing section 302.

Figure 6:
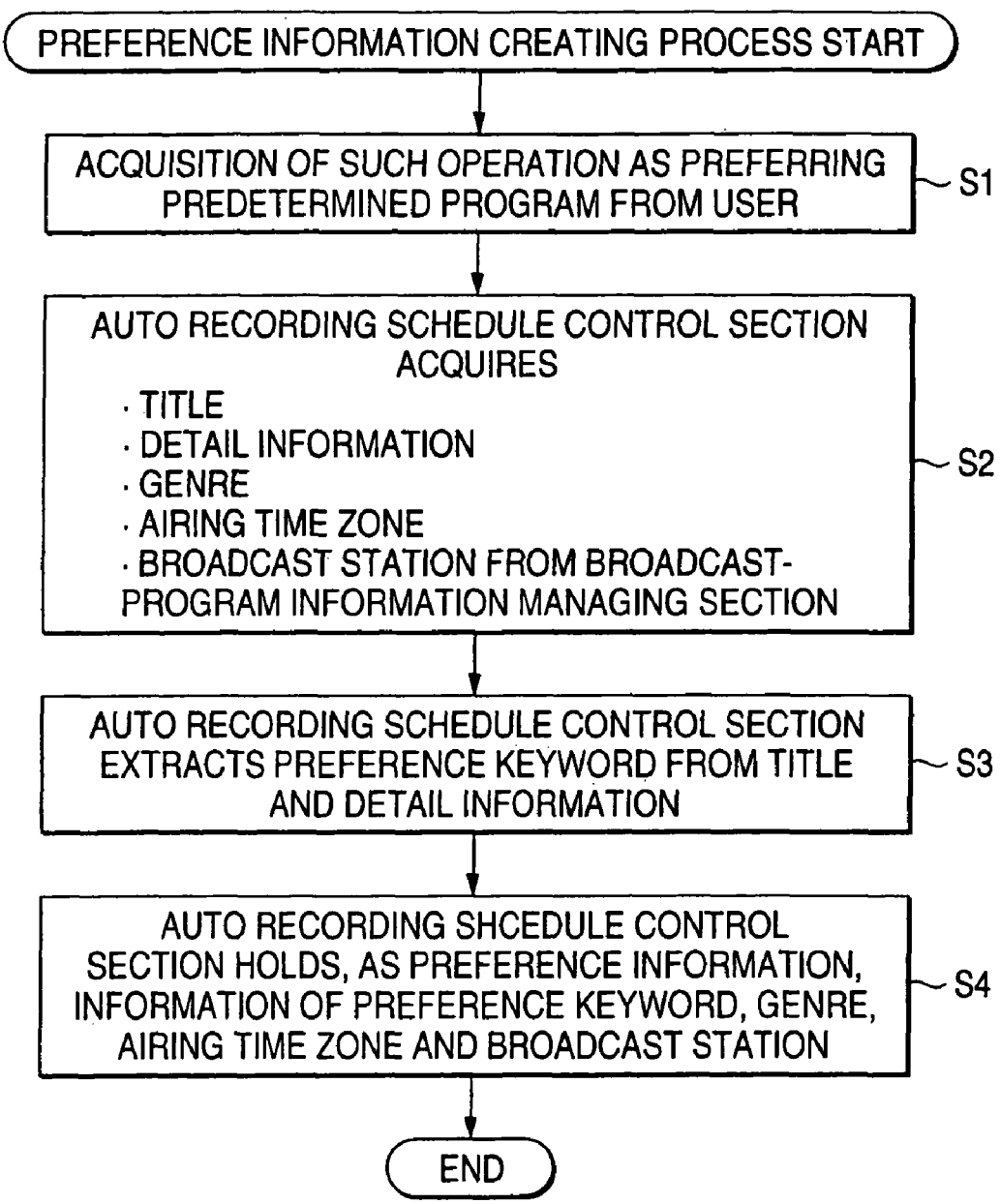
FIG. 6 is a flowchart explaining a preference-information preparing process in the video recording/reproducing unit of FIG. 1.

Referring now to the flowchart of FIG. 6, a preference information preparing process performed by the video recording/reproducing unit 11 of FIG. 3 is explained. Incidentally, this process is started when the user inputs an operation indicating he or she likes a predetermined program (operation expressing that he or she has a preference for a predetermined program) to the video recording/reproducing unit 11.

At step S1, the recording scheduling application 70, when the user inputs an operation indicating a preference for a predetermined program, acquires a signal based on that operation. Such operations include a scheduling for recording or a protection, for example. For example, when the user performs an operation to schedule recording of a certain program, the recording scheduling application 70 acquires it and executes a recording scheduling process.

At step S2, the auto recording schedule control section 71 acquires a title, detail information, genre, airing time and broadcast station of the program (program scheduled for recording by the process of step S1) from the broadcast program information (EPG information) stored in the broadcast-program information managing section 66. Namely, the broadcast-program information managing section 66 stores broadcast program information (EPG information) as shown, for example, in FIG. 17. Based on it, this process is to be executed.

At step S3, the auto recording schedule control section 71 extracts a preference keyword from the title or detail information acquired by the process of step S2 (extracted preference keyword provides keyword preference information 402 in FIG. 7). For example, in the case a particular public entertainer's name is included in the title or detail information, it will be extracted.

At step S4, the auto recording schedule control section 71 holds the preference keyword extracted by the process of step S3 and the information of genre, airing time and broadcast station acquired by the process of step S2, as preference information.

By the process of FIG. 6, the acquisition of preference information about a broadcast program is started depending upon the user's operation indicating that he or she likes a predetermined program (operation such as scheduling of recording, protection, etc.). Meanwhile, depending upon the user's operation indicating that he or she likes a predetermined program, the information of a preference keyword, genre, airing time and broadcast station extracted from the program detail information is acquired as preference information from the broadcast program information.

FIG. 7 represents an example of the preference information 401 acquired by the process of FIG. 6.

As shown in FIG. 7, the preference information 401 is configured by preference information about a broadcast program, including keyword preference information 402, genre preference information 403, broadcast station preference information 404 and time-zone or broadcast time preference information 405. Naturally, the preference information (keyword preference information 402, genre preference information 403, broadcast station preference information 404 and time-zone preference information 405) constituting the preference information 401 is not limited to these. The auto recording schedule control section 71, by looking up the preference information, can make a scheduling for recording programs to the taste of the user.

The keyword preference information 402 is configured by "keyword name", "update" and its "keyword name" point. In the FIG. 7 example, the first "keyword name" in the keyword preference information 402 is given as "Yamada Ichiroh", the time "update" that the "keyword name" has been updated is "2002.1.3 10:03:45", and the "keyword name" point is "30". Meanwhile, the second "keyword name" in the keyword preference information 402 is given as "Tanaka Hanako", the time "update" that the "keyword name" has been updated is "2002.1.3 10:03:45", and the "keyword name" point is "20". Furthermore, the third "keyword name" in the keyword preference information 402 is given as "baseball", the time "update" that the "keyword name" has been updated is "2002.1.3 10:03:45", and the "keyword name" point is "10". Meanwhile, the fourth "keyword name" in the keyword preference information 402 is given as "Sunday Theater", the time "update" that the "keyword name" has been updated is "2002.1.3 10:03:45", and the "keyword name" point is "25".

The "keyword name" point is greater in value with a higher user's preference degree for the keyword corresponding to the "keyword name". Incidentally, in the FIG. 7 example, although the "keyword name" point is a positive value, it can be given a negative value. For example, in the case there is a keyword the user does not prefer (dislikes), the "keyword name" can be held as a negative value in the preference information 401. Naturally, when the "keyword name" point has a negative value greater (smaller value) in absolute value, it is a keyword less preferred (more disliked) by the user.

In the FIG. 7 example, the "keyword name" in the keyword preference information 402 preferred the most by the user is "Yamada Ichiroh" (because the keyword name point is 30, or the greatest value).

The genre preference information 403 is configured by "genre id", "update" and its "genre id" point. In the FIG. 7 example, the first "genre id" in the genre preference information 403 is "1" ("1" is a value corresponding to sport). The time "update" that "genre id" has been updated is "2002.1.3 10:03:45", and the "genre id" point is given as "23". Meanwhile, the second "genre id" in the genre preference information 403 is "3" ("3" is a value corresponding to drama), the time "update" the "genre id" has been updated is "2002.1.3 10:03.45", and the "genre id" point is given as "−10".

The "genre id" point is greater in value with a higher user's preference degree. Incidentally, when the "genre id" point has a negative value, the genre corresponding to the "genre id" is a genre the user does not prefer (dislikes).

In the FIG. 7 example, the "genre id" in the genre preference information 403 preferred the most by the user is "1" (e.g., sport) (because the "genre point" is "23", or the greatest value), while the "genre id" not preferred the most (disliked) by the user is "3" (e.g., drama).

The information corresponding to broadcast station preference information 404 is configured by "station id", "update" and its "station id" point. In the FIG. 7 example, the first "station id" in the broadcast station preference information 404 is "1" ("1" is an ID corresponding to channel 1), while the time "update" that the "station id" has been updated is "2002.1.3 10:03:45" and its "station id" point is given as "23". Meanwhile, the second "station id" in the broadcast station preference information 404 is "5" ("5" is an ID corresponding to channel 5), while the time "update" that the "station id" has been updated is "2002.1.3 10:03:45" and its "station id" point is given as "−10".

Also in the "station id" point, a greater value corresponds to a higher user's preference degree. Incidentally, in the case the "station id" point is a negative value, the broadcast station corresponding to the "station id" is a broadcast station the user does not prefer (dislikes).

In the FIG. 7 example case, the "station id" in the broadcast station preference information 404 preferred the most by the user is "1" (e.g., channel 1) (because the "station id" point is "23", or the greatest value), while the "station id" not preferred (disliked) the most by the user is "5" (e.g., channel 5).

The information corresponding to the time-zone preference information 405 is configured by "time_zone id", "update" and its "time_zone id" point. In the FIG. 7 example, the first "time_zone id" in the time-zone preference information 405 is "0" ("0" is a value corresponding to from 0:00 to 1:00), while the time "update" that the "time_zone id" has been updated is given as "2002.1.3 10:03:45" and its "time_zone id" point is "50". Meanwhile, the second "time_zone id" in the time-zone preference information 405 is "2" ("2" is a value corresponding to from 2:00 to 3:00), while the time "update" that the "time_zone id" has been updated is given as "2002.1.3 10:03:45" and its "time_zone id" point is "−10". Furthermore, the third "time_zone id" in the time-zone preference information 405 is "4" ("4" is a value corresponding to from 4:00 to 5:00), while the time "update" that the "time_zone id" has been updated is given as "2002.1.3 10:03:45" and its "time_zone id" point is "−20". Meanwhile, the fourth "time_zone id" in the time-zone preference information 405 is "8" ("8" is a value corresponding to from 8:00 to 9:00), while the time "update" that the "time_zone id" has been updated is given as "2002.1.3 10:03:45" and its "time_zone id" point is "23".

Also in the "time_zone id" point, a higher preference degree corresponds to a greater value. Incidentally, when the "time_zone id" point has a negative value, the time zone corresponding to the "time_zone id" is one the user does not prefer (dislikes).

In the FIG. 7 example, the "time_zone id" in the time-zone preference information 405 preferred the most by the user is "0" (e.g., from 0:00 to 1:00) (because the "time_zone id" point is "50", or the greatest value), while the "time_zone id" not preferred (disliked) the most by the user is "4" (e.g., from 4:00 to 5:00).

The information in the above is stored as the user's preference information 401 in the user apparatus 3. The user of the user apparatus 3, when holding preference information in the above manner, registers it to the server 2-1 and allows the same to be used by a friend or the like.

Referring now to the flowchart of FIG. 8, an explanation is given of a process for registering the preference information the user of the user apparatus 3-2 has prepared (held) by himself/herself (user's preference information) in the server 2-1. Incidentally, this process is commenced when a user registration is instructed by the user.

At step S21, the auto recording schedule control section 71 acquires the preference information 401 (e.g., preference information 401 in FIG. 7) to be registered to the server 2-1. This preference information 401 has been prepared by executing the process shown in the flowchart of FIG. 6 by the user's scheduling of recording or the like.

At step S22, the auto recording schedule control section 71 takes control of the network communicating section 72 to access the server 2-1 through the network 1. The server 2-1 accepts the access from the user apparatus 3-2 (step S41 in FIG. 10 referred to hereinafter) and sends a trust registering screen (step S42 in FIG. 10). The user apparatus 3-2 receives the trust registering screen (FIG. 9 referred to hereinafter) sent from the server 2-1.

At step S23, the auto recording schedule control section 71 causes the display unit 12 to display the trust registering screen sent (step S42 in FIG. 12) by the server 2-1, through the use of the broadcast-program information display application 69. An example of the trust registering screen is shown in FIG. 9.

Figure 9:
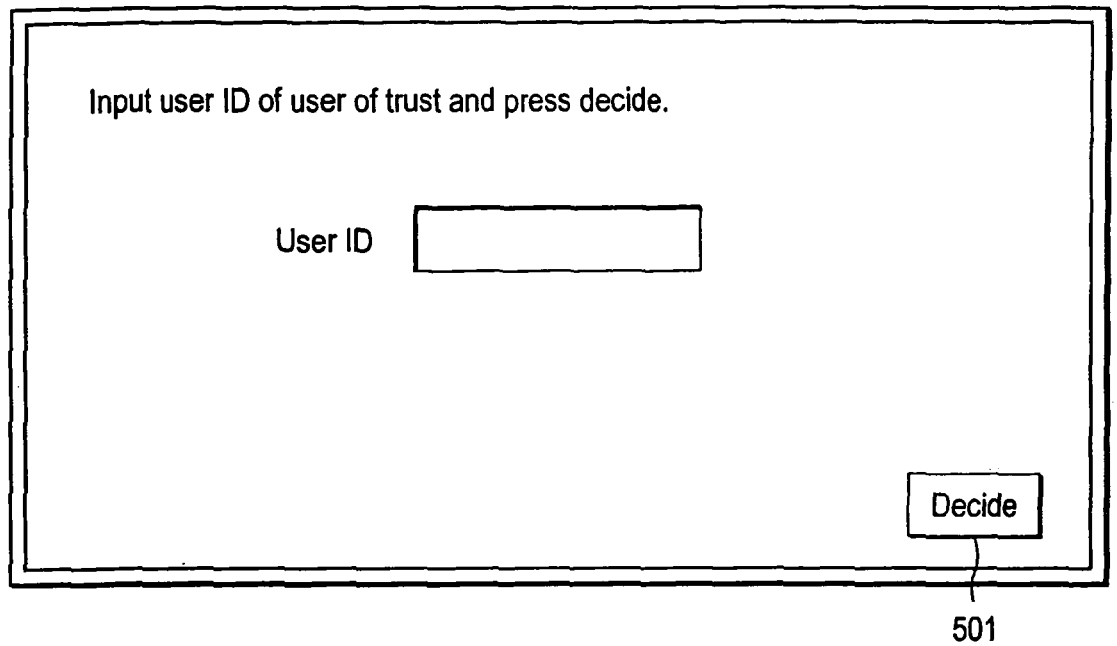
FIG. 9 is a figure showing a display example according to a process of step S23 in FIG. 8.

In FIG. 9, there is displayed a message "Input user ID of user of trust and press decide", as well as a box to input a user ID. The user inputs a user ID of another user by whom his/her own preference information is desirably utilized, and operates a decide button 501.

Referring back to FIG. 8, the auto recording schedule control section 71 at step S24 acquires a to-be-registered user ID. Specifically, when the user inputs a user ID on the screen shown in FIG. 9 and selects the decide button 501, the auto recording schedule control section 71 acquires a user ID inputted. In the present example, it is assumed that the user who is to execute this process is a user at the user apparatus 3-2, while the user to be registered is a user at the user apparatus 3-1 (i.e., the user ID to be registered is the user ID of the user at the user apparatus 3-1). This means that the user apparatus 3-2 allows the preference information to be provided to the user ID to be registered. Accordingly, the user who is to utilize this service is required to be registered to the server 2-1 and assigned with a user ID in advance.

At step S25, the auto recording schedule control section 71 sends the preference information 401 acquired by the process of step S21 and the user ID (user ID of the user at the user apparatus 3-1, in the present example) acquired by the process of step S24, to the server 2-1. The server 2-1 receives and registers it (steps S43 and S44 in FIG. 10 referred to hereinafter).

Figure 10:
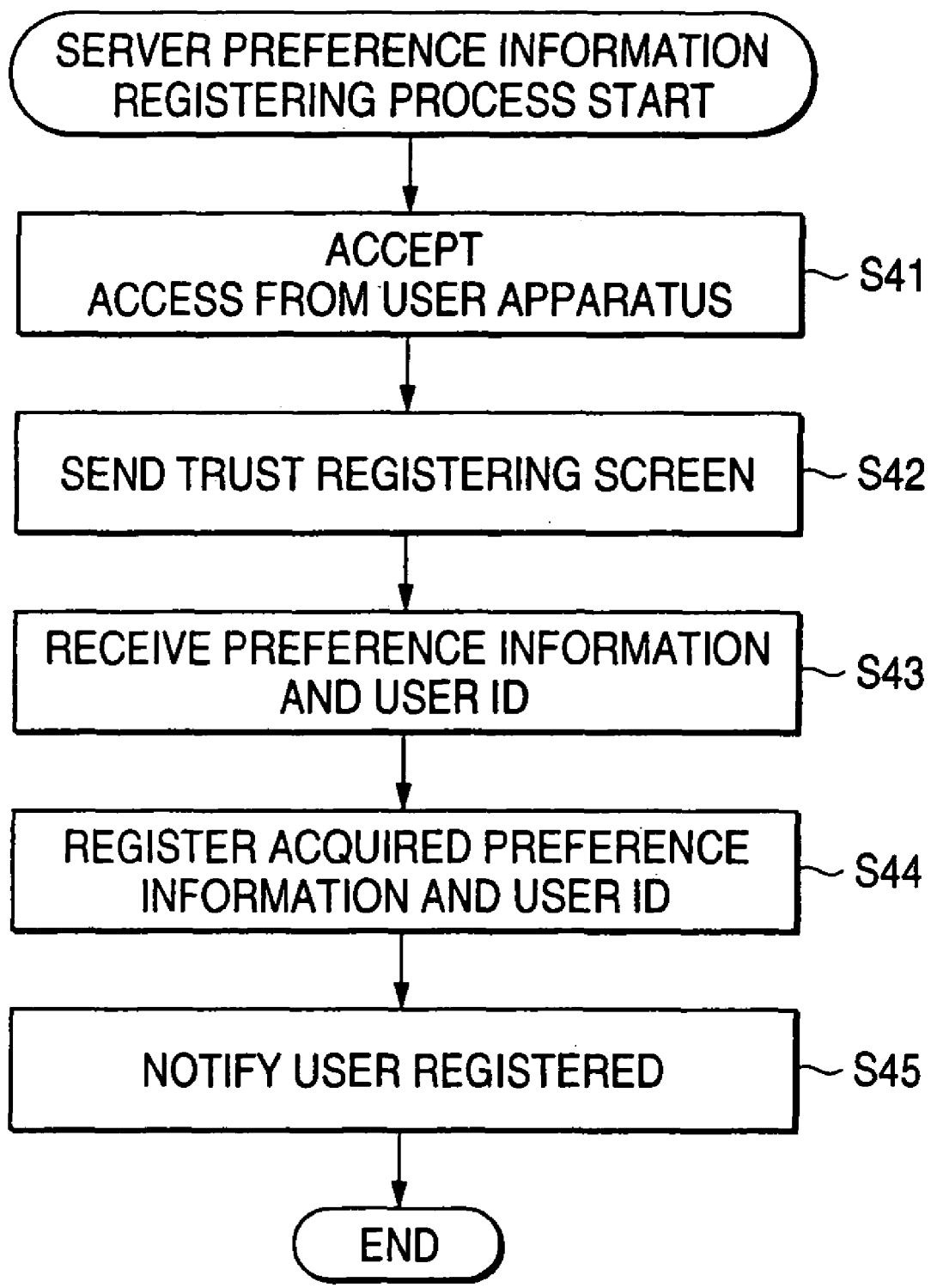
FIG. 10 is a flowchart explaining a process of registering the preference information in a server of FIG. 1.

Referring now to the flowchart of FIG. 10, an explanation is given of a user registering process on the server 2-1 corresponding to the process of FIG. 8 on the user apparatus 3-2. Incidentally, this process is commenced when accessed from the user apparatus 3-2.

At step S41, the network communicating section 301 accepts an access (step S22 in FIG. 8) from the user apparatus 3 (user apparatus 3-2 in the present case).

At step S42, the register managing section 302 reads out a trust registering screen (FIG. 9) under management of the screen managing section 303, and sends it to the user apparatus 3 through the network communicating section 301. Specifically, it sends the data of a trust registering screen shown in FIG. 9 noted above. The user apparatus 3 (user apparatus 3-2) receives and displays this screen (step S23 in FIG. 8), and acquires a to-be-registered user ID (user apparatus 3-1 in the present example) and preference information 401 (preference information of the user of the user apparatus 3-2), thus sending it to the server 2-1 (step S25 in FIG. 8).

Consequently, at step S43, the register managing section 302 receives the preference information 401 (preference information of the user of the user apparatus 3-2) and to-be-registered user ID through the network communicating section 301.

At step S44, the register managing section 302 acquires the preference information 401 (preference information of the user of the user apparatus 3-2) and user ID to be registered, and registers them to the preference information database 305. Specifically, it stores the preference information 401 to the preference information database 305 and the user ID (ID of the user apparatus 3-1) (user ID specifying the destination the program information is to be provided to) to customer database 304. Due to this, in the present case, registration is made that the user having the trust of the user on the user apparatus 3-2 is a user of the user apparatus 3-1.

At step S45, the register managing section 302 takes control of the network communicating section 301 to notify the registered user (user apparatus 3-1 in the present example) of the fact registration has been made from the user apparatus 3 (user apparatus 3-2 in the present example).

In this manner, preference information is registered by the process of FIGS. 8 and 10.

Figure 11:
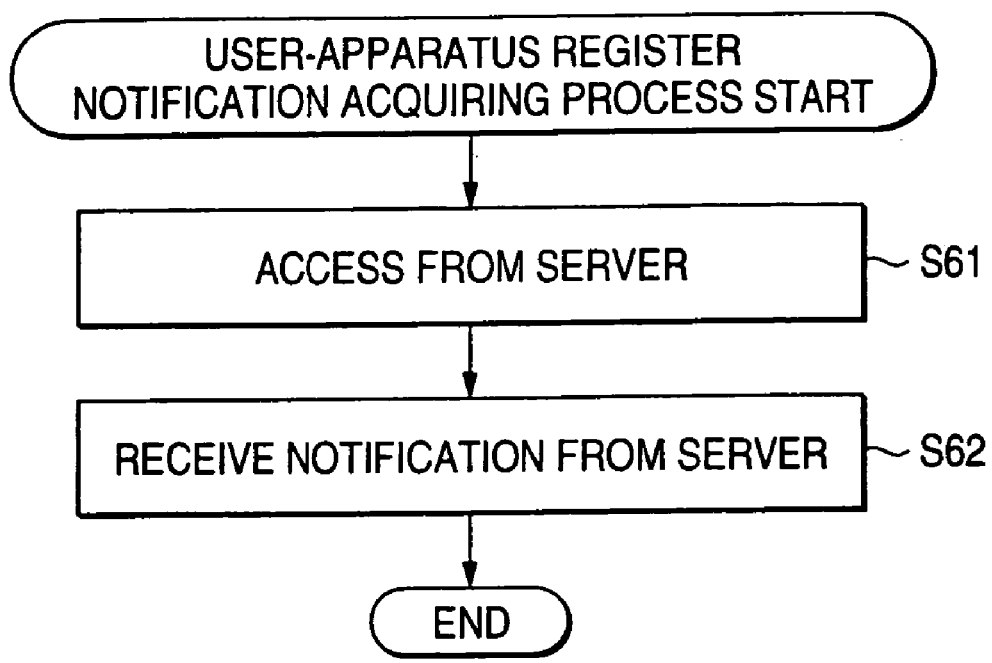
FIG. 11 is a flowchart explaining a process of registration notification acquisition in the user apparatus of FIG. 1.

Referring now to the flowchart of FIG. 11, an explanation is given of a process of the user apparatus 3 (e.g., user apparatus 3-1) to be executed corresponding to the process of step S45 of FIG. 10. Incidentally, this process is commenced when notification of registration is made from the server 2-1 to the user apparatus 3 (user apparatus 3-1).

At step S61, the user apparatus 3 (user apparatus 3-1 in the present example case) accepts an access from the server 2-1 (step S45 in FIG. 10).

At step S62, the user apparatus 3 (user apparatus 3-1 in the present case) receives a notification from the server 2-1. This notification contains the information indicating that preference information (preference information of the user of the user apparatus 3-2) has been registered by the user apparatus 3-2 having executed the process of FIG. 8. By receiving this notification, the user of the user apparatus 3-1 is allowed to know the fact that preference information (preference information of the user of the user apparatus 3-2) has been registered by another user apparatus (user apparatus 3-2 in this case).

Figure 12:
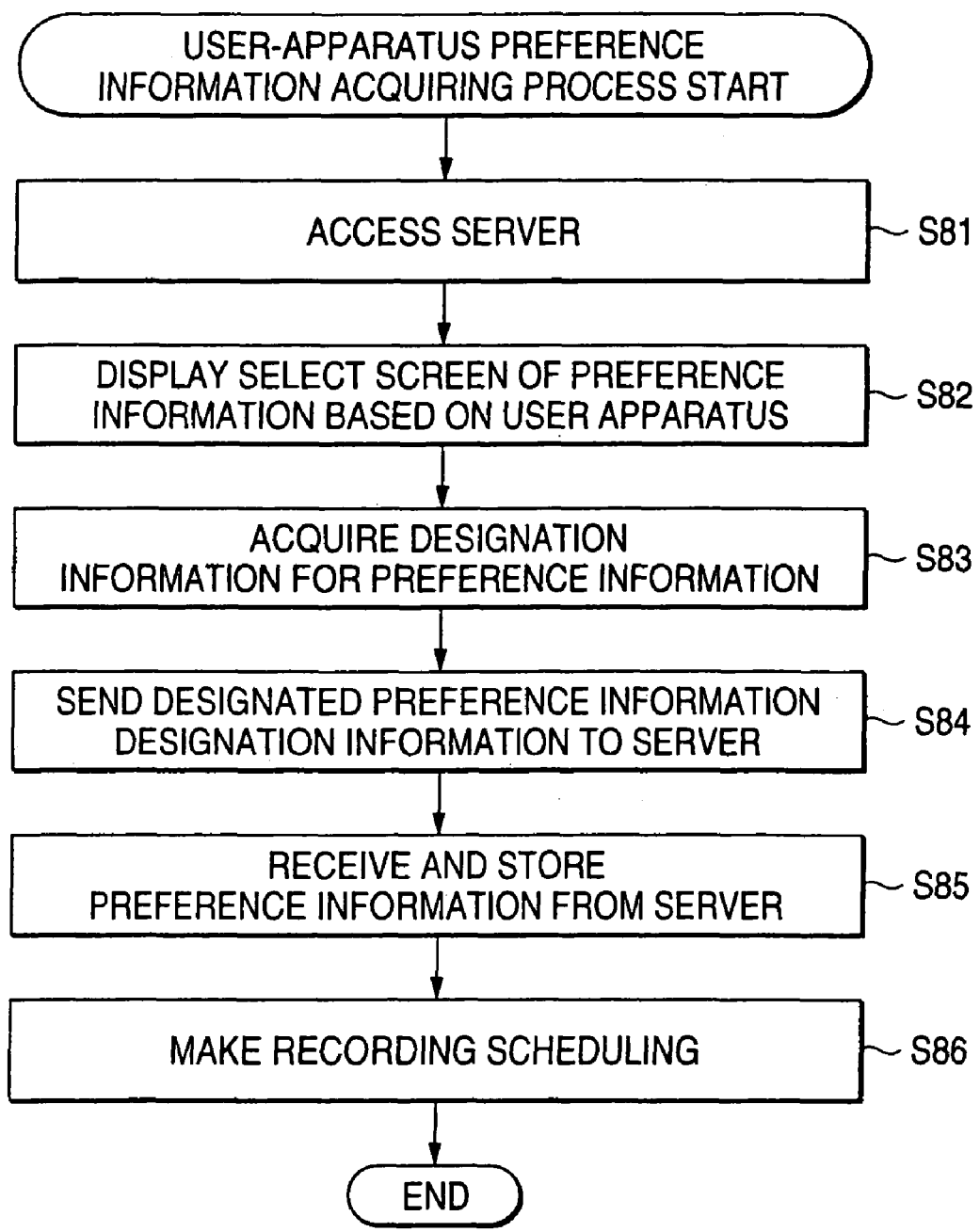
FIG. 12 is a flowchart explaining a process of preference-information acquisition in the user apparatus of FIG. 1.

Referring now to the flowchart of FIG. 12, an explanation is given of a preference information acquiring process by the user apparatus 3. Incidentally, this process is commenced when instructed to make a scheduling of recording by the user possessing the user apparatus 3 (e.g., user apparatus 3-1).

At step S81, the network communicating section 72 accesses the server 2-1 on the basis of an instruction by the user. The server 2-1 accepts the access (step S111 in FIG. 14 referred to hereinafter). In the case it is determined that the user apparatus 3 (e.g., user apparatus 3-1) has been registered as a destination for providing the preference information (in the case the result is YES in step S112 in FIG. 14), a select screen is sent for selecting one of a plurality of pieces of preference information of user apparatuses 3 (step S113 in FIG. 14).

Consequently, at step S82, the network communicating section 72 receives from the sever 2-1 the select screen for selecting one of a plurality of pieces of preference information of user apparatuses 3. The auto recording schedule control section 71 takes control of the broadcast-program display application 69, and causes the display unit 12 to display the select screen for selecting one of a plurality of pieces of preference information of user apparatuses 3.

Figure 13:
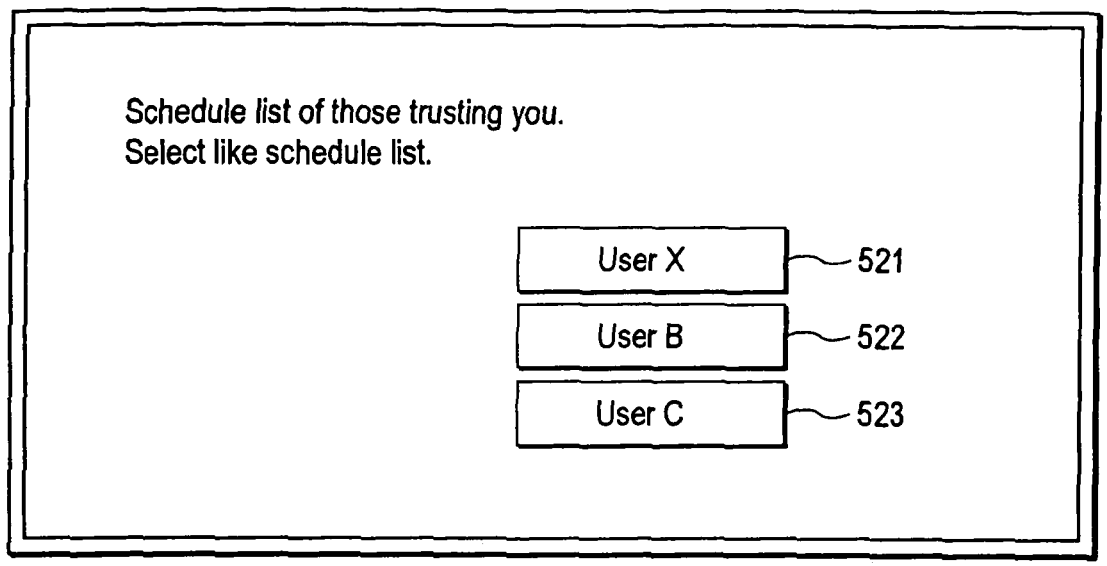
FIG. 13 is a figure showing a display example according to a process of step S82 in FIG. 12.

At this time, a display example to be displayed on the display unit 12 is shown in FIG. 13. In FIG. 13, there is displayed a message "Schedule List Of Those Trusting You. Select Like Schedule List". Below the message, there are arranged, for selection, User X button 521, User B button 522 and User C button 523. The user selects any one of the User X button 521, the User B button 522 and the User C button 523. Incidentally, the User X button 521, the User B button 522 and the User C button 523 displayed in FIG. 13 are of the user names of the user IDs registered together by the foregoing step S25 of FIG. 8 and step S44 of FIG. 10.

At step S83, the auto recording schedule control section 71 accepts a piece of designation information for designating a predetermined one out of a plurality of pieces of preference information on the basis of the user's operation. For example, in the case that the User B button 522 is selected by the user on the FIG. 13 screen displayed on the display unit 12 by the process of step S82, designation information is acquired representing that the User B button 522 has been designated.

At step S84, the network communicating section 72 sends the designation information on the designated preference information (designation information acquired by the process of step S83) to the server 2-1. In the case that the designation information indicates that the User B button 522 has been designated by the process of step S83, the user apparatus 3 sends the server 2-1 the designation information indicating that the User B button 522 has been designated. The server 2-1 receives this designation information (step S114 in FIG. 14), and sends preference information to the user apparatus 3 (step S115 in FIG. 14). In this case, the server 2-1 sends the preference information previously registered by the User B in the server 2-1 (preference information database 305 in the server 2-1).

Consequently, at step S85, the auto recording schedule control section 71 receives the preference information (e.g., preference information 401 in FIG. 7) sent from the server 2-1 through the network communicating section 72. The recording schedule managing section 67 stores it to the preference information database (auxiliary storage device 40) internally provided. This preference information is preference information corresponding to the designated designation information sent by the process of step S84. In this case, because the designation information indicates that the User B button 522 has been designated, the preference information previously registered by the User B is received and stored.

At step S86, the recording schedule managing section 67 makes a recording scheduling on the basis of the preference information received and stored by the process of step S85. Namely, scheduling of recording is made for the program designated by the stored preference information so that a recording operation can be started at a predetermined time.

Figure 14:
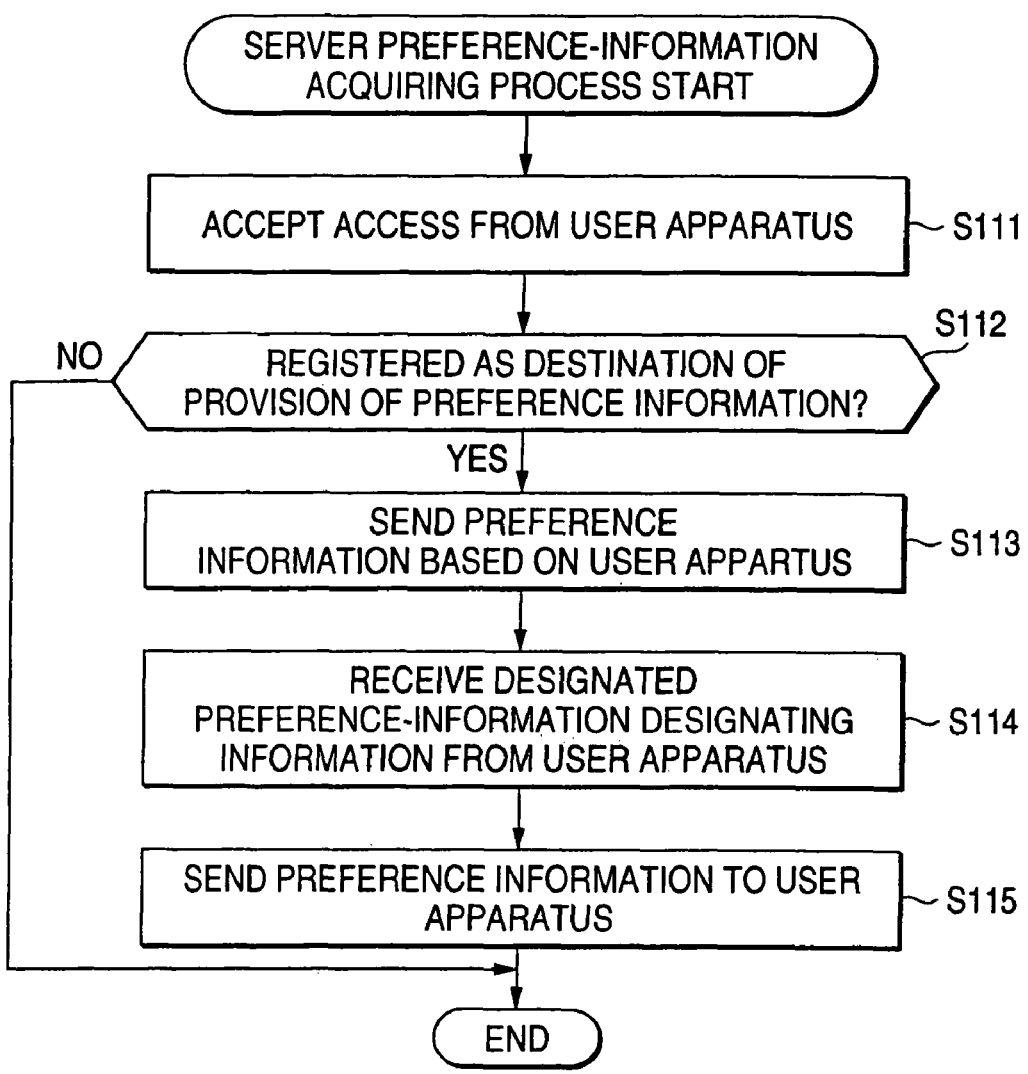
FIG. 14 is a flowchart explaining a preference-information acquisition process in the server of FIG. 1.

Referring now to the flowchart of FIG. 14, an explanation is given of a preference information acquiring process of the server 2-1 corresponding to the process of FIG. 12 to be executed by the user apparatus 3. Incidentally, this process is commenced when the server 2-1 is accessed from the user apparatus 3 (user apparatus 3-1 in the present case) by the process of step S81 of FIG. 12.

At step S111, the network communicating section 301 accepts an access (step S81 of FIG. 12) from the user apparatus 3. For example, it accepts an access from the user apparatus 3-1.

At step S112, the register managing section 302 determines whether or not the accessing user apparatus 3 (user apparatus 3-1 in the present example) has been registered as a destination to be provided preference information. Specifically, the register managing section 302 looks up the customer database 304 and determines whether or not the user apparatus 3 (user apparatus 3-1 in the present example) has been registered as a destination to be provided preference information. In the case it is determined that the user apparatus 3 (user apparatus 3-1 in this example) has been registered as a destination to be provided preference information, the process proceeds to step S113, to send a select screen for selecting one of a plurality of pieces of preference information of user apparatuses 3.

The user apparatus 3 receives and displays the select screen for selecting one of a plurality of pieces of preference information of user apparatuses 3 (step S8 in FIG. 12), thereby prompting a designation to be made, whereby it sends the server 2-1 the designation information about the designated preference information (step S84 in FIG. 12). In this example, designation information is sent representing that the User B button 522 has been designated.

At step S114, the network communicating section 301 receives the designation information about the designated preference information from the user apparatus 3-1. The register managing section 302 reads the preference information of the program (e.g., preference information 401 in FIG. 7) from the preference information database 305 on the basis of the designation information. In this example, designation information is received representing that the user B button 522 has been designated, based on which the preference information registered by the User B is read out.

At step S115, the register managing section 302 sends the preference information (e.g., preference information 401 in FIG. 7) read out by the process of step S114, to the user apparatus 3 through the network communicating section 301. This preference information is received by the user apparatus 3, based on which a recording scheduling process is implemented (steps S85, S86 in FIG. 12).

After the process of step S115 or in the step of S112, in the case of a determination that the accessing user apparatus 3 has not been registered as a destination to be provided preference information, the process is terminated.

Incidentally, it is also possible to previously send the preference information of all the other users registered by the process of step S113. In this case, because the user apparatus 3 itself can select required preference information, the processes of steps S114, S115 can be omitted. Meanwhile, in the user apparatus 3, the processes of steps S84, S85 in FIG. 12 can also be omitted. However, in this case, there is an increase in the amount of the data to be communicated.

By the process of FIGS. 12 and 14, the user apparatus 3 acquires from the server 2-1 a select screen for selecting one of a plurality of pieces of preference information of another user apparatus 3, and sends a selected piece of designation information on the selected preference information to the server 2-1. Preference information based on the designation information is received from the server 2-1, thereby carrying out a recording scheduling. This makes it possible to implement a scheduled recording on the basis of the preference information by another user apparatus 3. The user is allowed to share the same program with another user by providing preference information to the other user. Meanwhile, if the preference information of another user if utilized, it is possible to omit the labor and time for preparing preference information by himself/herself.

Figure 15:
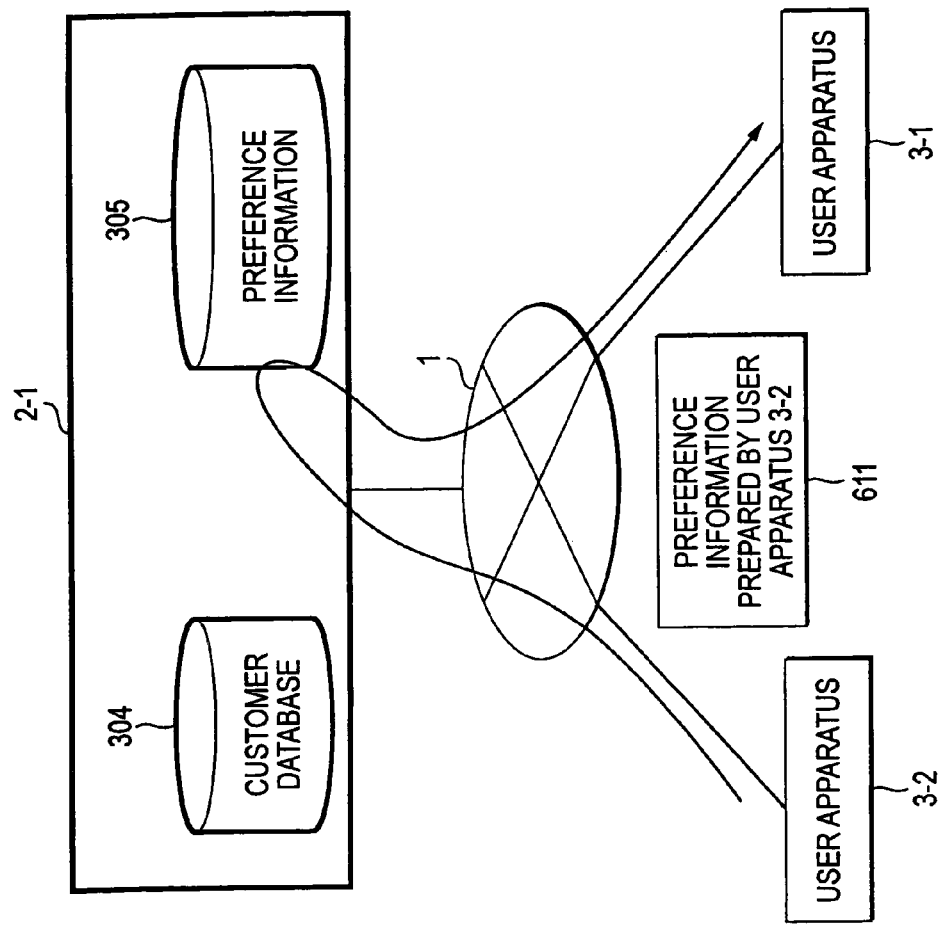
FIG. 15 is a figure explaining a preference-information registration process.

The above process, if summarized, is as follows. Namely, as shown in FIG. 15, the customer database 304 and the preference information database 305 are held in the server 2-1. The customer database 304 is stored with the customer data of the user apparatus 3-1 and the user apparatus 3-2. This can restrict the users who are allowed to use preference information. The user apparatus 3-2 supplies the preference information prepared by itself (e.g., preference information prepared by the process of FIG. 6) to the server 2-1 through the network 1. The server 2-1 registers this to the preference information database 305. By receiving a notification of preference information from the server 2-1 or voluntarily at a predetermined time as required, when the user apparatus 3-1 accesses the server 2-1, the server 2-1 sends the preference information prepared by the user apparatus 3-2 (a user registered in the customer database 304) (step S113 in FIG. 14).

The user apparatus 3-1 designates the preference information prepared by the registered user apparatus 3 (user apparatus 3-2 in the FIG. 15 example)(in the case that preference information is registered by a plurality of users, this is designated), and designated designation information is sent to the server 2-1 (step S84 in FIG. 12).

The server 2-1 receives this designation information and acquires the preference information 611 stored in the preference information database 305 which corresponds to the designated information (e.g., preference information of the user apparatus 3-2), sending it to the user apparatus 3-1 through the network 1. The user apparatus 3-1 receives this preference information and causes the auto recording schedule control section 71 to execute a recording process (recording scheduling) based on the preference information.

Incidentally, the manager of the server 2-1 can impose a charge on the user of the user apparatus 3 for providing the above service, to thereby gain profits.

Meanwhile, the user ID may be a plurality that are to be acquired by the auto recording schedule control section 71 at the step S24 in FIG. 8. In the case the auto recording schedule control section 71 is arranged to acquire user IDs (destination-of-provision information) in plurality at step S24, then the acquired preference information and a plurality of users (destinations of provision) are registered at step S44 in FIG. 10. This makes it possible to provide the same preference information to the plurality of users (destinations of provision).

As in the above, the user apparatus 3 acquires preference information through the server 2-1 and causes the auto recording schedule control section 71 to carry out a recording scheduling process. Also, it acquires the preference information prepared by the user himself/herself and causes the auto recording schedule control section 71 to carry out a recording scheduling process. Once this setting (selection) is done by the user, scheduling of recording is automatically effected as explained in the next.

Figure 16:
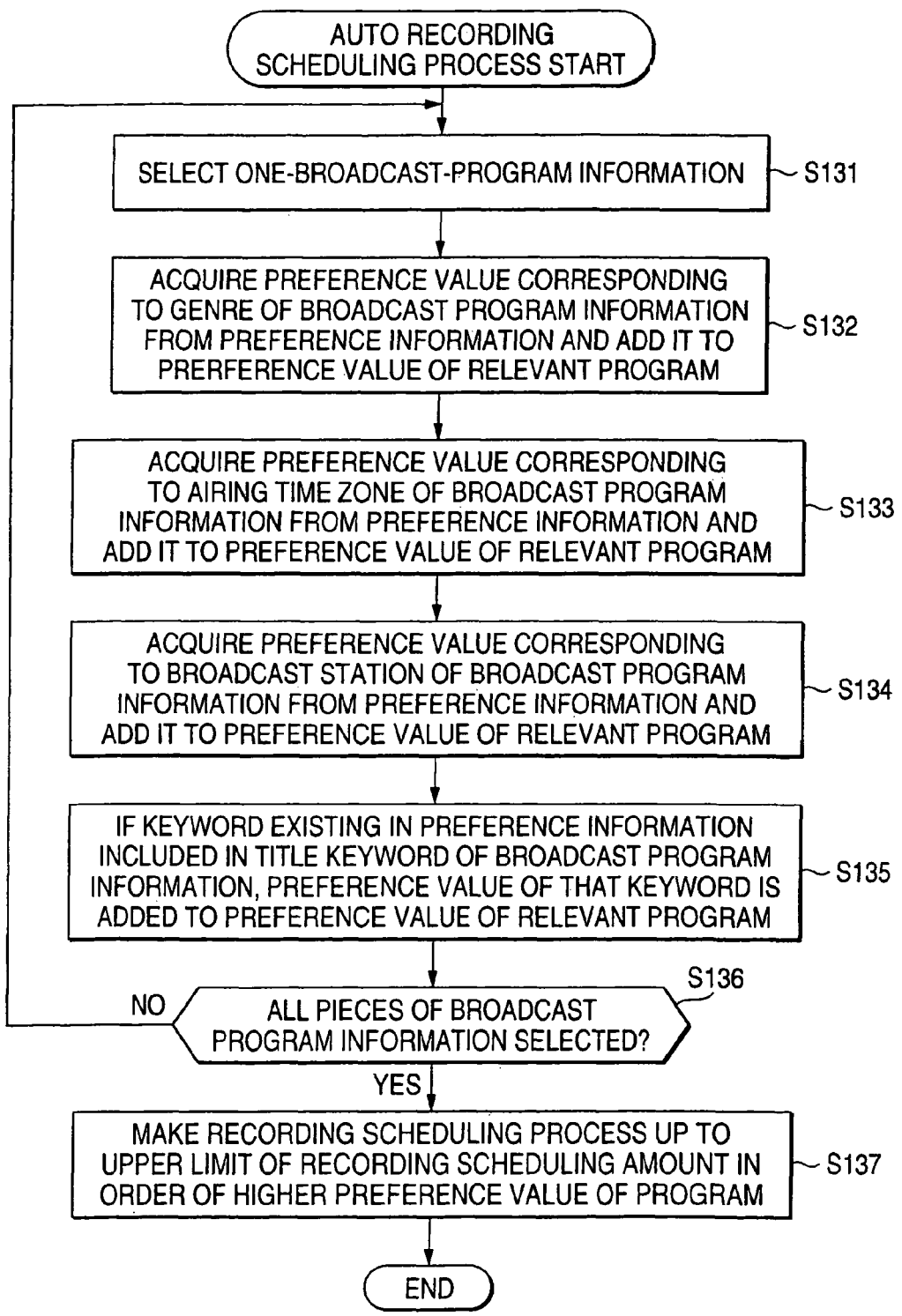
FIG. 16 is a flowchart explaining a process of scheduling for recording in the video recording/reproducing unit of FIG. 1.

Referring now to the flowchart of FIG. 16, an explanation is given of a recording scheduling process to be automatically effected on the basis of preferential information by the auto recording schedule control section 71. Incidentally, the process shown in the FIG. 16 flowchart is periodically executed at a predetermined time interval previously set.

At step S131, the auto recording schedule control section 71 selects one piece of broadcast program information from the stored broadcast program information (EPG information) in an amount of two days, for example. As noted above, the EPG information is acquired by the EPG acquisition module 34 and placed under management of the broadcast-program information managing section 66. Specifically, the EPG information is stored by the auxiliary storage device 40.

FIG. 17 represents an example of such EPG information (broadcast program information). Incidentally, this FIG. 17 example represents one program of broadcast program information. The auxiliary storage device 40 stores the broadcast program information of the nearest programs to be aired for two days from the current time, for example.

In the FIG. 17 example, the broadcast station to air the program is "TV Japan", and the date to air is Mar. 26, 2002. Meanwhile, this program has a broadcast start time of 17:00 and an end time of 18:00. Furthermore, this program is variety in genre, having a program title of "News 17". Furthermore, there is described, as detail information, information including "Premier Resigned, Yen's Depreciation Inching . . . ."

In the process of step S131, a selection is made of one program of broadcast program information as shown in FIG. 17, for example.

Next, at step S132, the auto recording schedule control section 71 acquires a preference value corresponding to the genre of the broadcast program information from the preference information and adds it to the preference value of the relevant program. Namely, in the case the genre of the broadcast program information selected by the process of step S131 falls under the genre preference information 403 of the preference information 401, the auto recording schedule control section 71 adds the preference value to the preference value of the relevant program (broadcast program information selected by the process of step S131).

The preference information to be used herein is the stored preference information transferred from the other user apparatus 3 in the process of step S85 of FIG. 12 or the preference information registered and held by executing the process shown in the flowchart of FIG. 6 by the user apparatus 3 itself.

At step S133, the auto recording schedule control section 71 acquires a preference value corresponding to the airing time of the broadcast program information from the preference information and adds it to the preference value of the relevant program. Namely, in the case the airing time of the broadcast program information selected by the process of step S131 falls under the time-zone preference information 405 of the preference information 401, the auto recording schedule control section 71 adds the preference value to the preference value of the relevant program (broadcast program information selected by the process of step S131).

At step S134, the auto recording schedule control section 71 acquires a preference value corresponding to the broadcast station of the broadcast program information from the preference information and adds it to the preference value of the relevant program. Namely, in the case the broadcast station of the broadcast program information selected by the process of step S131 falls under the broadcast-station preference information 404 of the preference information 401, the auto recording schedule control section 71 adds the preference value to the preference value of the relevant program (broadcast program information selected by the process of step S131).

At step S135, if a keyword existing in the preference information is contained in the title keyword of the broadcast program information, the auto recording schedule control section 71 adds the preference value of that keyword to the preference value of the relevant program. Namely, in the case the keyword of the broadcast program information selected by the process of step S131 is contained in the keywords existing in the keyword preference information 402 of the preference information 401, the auto recording schedule control section 71 adds the preference value to the preference value of the relevant program (broadcast program information selected by the process of step S131).

The processes of steps S132 to S135 set a preference value for one piece of broadcast program information selected by the process of step S131 (preference values are added by the respective steps, and the preference values after the process of step S135 provide preference values for this broadcast program information).

At step S136, the auto recording schedule control section 71 determines whether or not all the pieces of broadcast program information (EPG information) have been selected. In the case it is determined that all the pieces of broadcast program information have not been selected yet (in the case there is a program not having been selected), the process returns to step S131 where the broadcast program information of the next one program is selected, to execute the process of step S132 and the subsequent steps similarly to the foregoing case.

In the case it is determined at step S136 that all the pieces of broadcast program information have been selected (in the case it is determined that the broadcast program information in an amount of two days has been selected), the process proceeds to step S137. The auto recording schedule control section 71 takes control of the recording schedule managing section 67 to make an addition in the higher order of program preference value to the recording schedule list up to the upper limit in the amount of recording schedule (make a recording scheduling process). Thereafter, the process is terminated.

Incidentally, the auto recording schedule control section 71, in the case the information registered in the preference information 401 includes a negative point value, may exclude the program from a subject of search or may add a negative point of preference value. In the FIG. 7 example, in the case a preference value having a "genre id" "3" in the genre preference information 403, a "station id" of "5" in the broadcast station preference information 404, a "time_zone id" of "2" in the time zone preference information 405 or a "time_zone id" of "4" in the time zone preference information 405 is included in each broadcast program (e.g., FIG. 17) selected by the process of step S131, the program is excluded from the subject of search or added as a negative point of preference value.

As in the above, the auto recording schedule control section 71 causes the recording schedule managing section 67 to prepare a recording schedule list as shown in FIG. 18.

In the FIG. 18 example, there is registered the airing date, broadcast station, airing start time and airing end time of the programs to be picture-recorded. For example, there is registered a program to be aired at 16:00:00 to 16:30:00 on 2002, Jul. 1, by the broadcast station "TV Japan", as a program scheduled for recording.

This recording schedule list is automatically prepared merely by the user's registration of preference information or selecting an operation. Accordingly, the user is not forced by an excessive burden in preparing the recording schedule list. Also, it is possible to automatically carry out a scheduling for recording matched to other users registered or selected.

Incidentally, of course, it is possible for the user to individually designate predetermined programs through the recording scheduling application 70 and register those to the recording schedule list.

Figure 19:
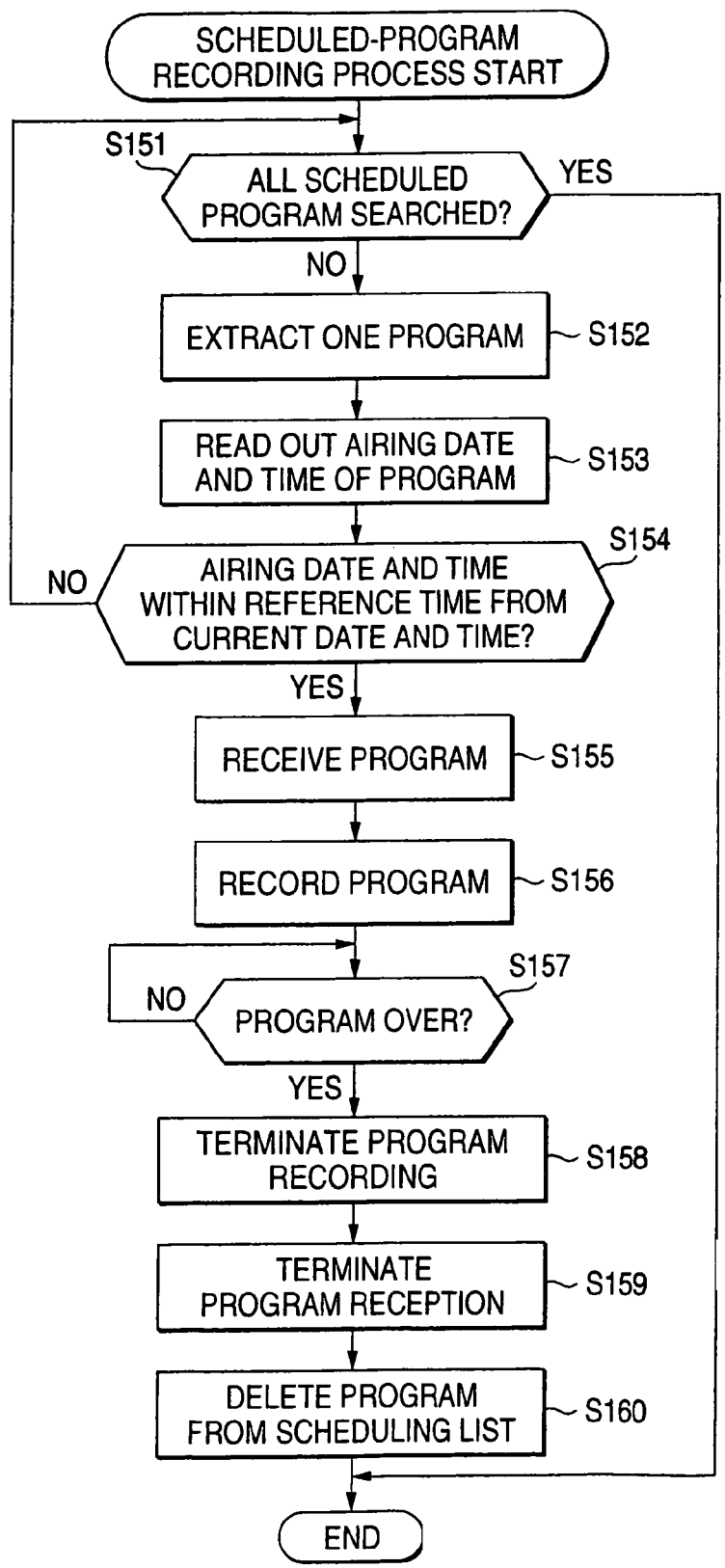
FIG. 19 is a flowchart explaining a process of recording a scheduled program in the video recording/reproducing unit of FIG. 1.

In case a recording schedule list is prepared as in the above, the recording schedule managing section 67 executes a recording process on scheduled programs. Referring now to the flowchart of FIG. 19, an explanation is given of a recording process for scheduled programs. Incidentally, the process shown in the flowchart of FIG. 19 is to be periodically executed at a constant time interval.

At step S151, the recording schedule managing section 67 determines whether all the programs scheduled in the recording schedule list have been searched. In the case there is a scheduled program not having been searched, the process proceeds to step S152 where the recording schedule managing section 67 extracts one program from the recording schedule list. At step S153, the recording schedule managing section 67 reads out the airing date and time of the program extracted in the process of step S152. For example, in the case the program shown at number 1 in FIG. 18 is extracted by the process of step S152, its airing date and time "Jul. 1, 2002, 16:00:00" is read out as an airing date and time in the process of step S153.

At step S154, the recording schedule managing section 67 reads out the current date and time from the incorporated timer and determines whether or not the airing date and time read out in the process of step S153 is within a reference time from the current date and time. The reference time is a comparatively short time, e.g., 30 seconds or 1 minute. This reference time is determined taking account of a time required from instructing control through the recording control section 63 to actually starting a recording process.

In the case that the airing date and time is determined not to be within the reference time from the current date and time, the process returns to step S151 to repeatedly execute the subsequent process.

For example, in case the current date and time is "Jul. 1, 2002, 12:00:00", the current date and time is four hours before the airing date and time and hence determined not to be within the reference time. The process returns to step S151, again making a determination whether all the scheduled programs have been searched. In the present case, because all the programs have not yet been searched, the process proceeds to step S152 where the next one program is extracted. For example, the program shown at number 2 in FIG. 18 is extracted. At step S153, the airing date and time at number 2 is read out as "Jul. 1, 2002, 17:30:00".

At step S154, it is determined whether or not the airing date and time is within a reference time from the current date and time. In the case it is not within the reference time, the process returns to step S151 to repeatedly execute the subsequent process.

For example, in the case that the program at number 1 is selected and the current date and time is "Jul. 1, 2002, 15:59:30", the airing date and time "Jul. 1, 2002, 16:00:00" is within 30 seconds from the current date and time "Jul. 1, 2002, 15:59:30" (within the reference time). Accordingly, it is determined at step S154 that the airing date and time is within the reference time from the current date and time. In this case, the process proceeds to step S155 where the recording schedule managing section 67 takes control of the recording control section 63 to receive the program concerned. In this case, the broadcast radio waves of broadcast station TV Japan are caused to be received by the tuner 31.

At step S156, the recording schedule managing section 67 takes control of the recording control section 63 to store the program received by the process of step S155 to the auxiliary storage device 40.

Namely, the video and audio signals received at this time by the tuner 31 are supplied to the encoder 32 where they are encoded under the MPEG scheme and then supplied to and stored in the auxiliary storage device 40.

At step S157, the recording schedule managing section 67 determines whether the program is over or not by comparing between the airing end time of the program now being recorded and the current date and time. In the case the program is not yet over, the end is waited for. In the case the program is over, the process proceeds to step S158 where the recording schedule managing section 67 takes control of the recording control section 63 to terminate the recording process into the auxiliary storage section 40. Also, at step S159, the recording schedule managing section 67 takes control of the recording control section 63 to terminate the program reception process by the tuner 31.

At step S160, the recording schedule managing section 67 deletes the program now recorded from the recording schedule list.

At step S151, in case it is determined that all the programs scheduled have been searched, the process of steps S152 to S160 is skipped over to end the process.

The above process is executed at a constant time interval to automatically picture-record the programs registered in the recording schedule list sequentially to the auxiliary storage device 40.

Incidentally, the recording schedule list shown in FIG. 18 can be arranged by sorting in the order of airing date and time. By doing so, the program first extracted by the process of step S152 could have the earliest airing date and time. In the case that its airing date and time is determined not within a reference time from the current date and time, all the remaining programs are resultingly not within the reference time from the current date and time. Accordingly, it is possible to omit the determination process concerning those programs.

After the program has been recorded to the auxiliary storage device 40 in the above manner, the recording title managing section 65 registers and manages the information about the title, airing date and time, etc. of the program picture-recorded.

When the user instructs to reproduce the picture-recorded program through the viewing-control application 68, the viewing-control application 68 looks up the management information in the recording title managing section 65 and reads out the program titles picture-recorded in the auxiliary storage device 40, causing the display unit 12 to display them. When the user looks at the display and selects a program to be reproduced, the viewing-control application 68 instructs the recording title reproducing section 62 to reproduce the program. The recording title reproducing section 62 reproduces the instructed program from the auxiliary storage device 40. The video and audio data reproduced from the auxiliary storage device 40 is inputted to the decoder 33 where it is decoded under the MPEG scheme, followed by being outputted to and displayed on the display unit 12.

By the above process, the user apparatus 3 acquires the preference information prepared by the registered user and causes the auto recording schedule control section 71 to carry out a recording process. The auto recording schedule control section 71 causes the recording schedule managing section 67 to prepare a recording schedule list (FIG. 18) and carry out a recording process. This allows for exchanging preference information between the terminals (user apparatuses 3-1, 3-2), making it possible to make a recording scheduling of a program easily and swiftly without imposing a burden on the user.

Meanwhile, because preference information can be exchanged between friends (user apparatuses in plurality), it is possible to view a program the friends like and to feel the preferences of the mutual users.

Furthermore, it is possible to levy from the user a use charge in return for the service the server 2-1 (service provider) has provided the field for exchanging preference information, making commercialization feasible.

Meanwhile, the server 2-1 (service provider), because it is capable of gathering the customer information and preference information of the user on the user apparatus 3, can utilize it and make a product proposal, etc. effectively to the user.

Although the above was adapted to receive broadcast program information from broadcast stations through broadcast radio waves, it can be received from the server 2-2 through the network 1. Meanwhile, although preference information was to be registered to the server 2-1 and sent to the user apparatus 3, this is not limitative, e.g., preference information can be generated from the information of a program actually picture-recorded instead of scheduled by the user. In brief, any piece of information is to be applied provided that it is preference information capable of specifying a program as a subject of recording.

The foregoing series of processes, although they can be executed on hardware, can also be carried out through software. In the case of executing the series of processes by software, the program configuring that software is installed from the network or a recording medium onto a computer incorporated in exclusive hardware or, for example, onto a general-purpose personal computer capable of executing various functions by being installed with various programs.

The recording medium, as shown in FIG. 4, is configured not only by a removable media 231 constituted by a program-recorded magnetic disk (including floppy disk), optical disk (including a CD-ROM (Compact Disk-Read Only Memory) or DVD (Digital Versatile Disk)), magnetooptical disk (including an MD (Mini-Disk)) or semiconductor memory distributed for providing a program to the user separately from the apparatus main body, but also by a ROM 222 recording a program or a hard disk included in the storage section 228 provided in a state previously incorporated in the apparatus main body to the user.

Incidentally, in the present specification, the steps describing a program recorded to the recording medium include, of course, a process to be chronologically executed in a described order, and a process to be executed in parallel or discretely even if not necessarily to be processed chronologically.

Meanwhile, in the present specification, system represents the apparatus overall constituted by a plurality of apparatuses.

According to a first invention, it is possible to make a scheduling of recording a program. In particular, according to the invention, scheduled recording is possible swiftly for a program matched to preference information.

According to a second invention, it is possible for a user on another information processing apparatus to make a program scheduling. In particular, recording of a program can be scheduled swiftly and easily without imposing a heavy burden on the user.

According to a third invention, it is possible to picture-record a scheduled program without generating preference information by an information processing apparatus itself.

According to a fourth invention, it is possible to exchange preference information between a first information processing apparatus and a second information processing apparatus. This makes it possible to earn a profit as desired.

The invention claimed is:

1. An information processing system, comprising:
a first user apparatus;
a second user apparatus operable to exchange information with the first user apparatus; and
a server apparatus operable to control information exchange between the first user apparatus and the second user apparatus;
the first user apparatus, the second user apparatus and the server apparatus each being connected to a network;
the first user apparatus including:
acquiring means for acquiring, from program guide information, information about a to-be-provided program based on user input provided by a first user to the first user apparatus, and for extracting preference information of the first user from the information about the to-be-provided program, the preference information of the first user including a plurality of preference keywords associated with the to-be-provided program,
first transmitting means for sending, to the server apparatus, the preference information of the first user and a destination device to which the preference information of the first user is to be provided;
the server apparatus including:
registering means for registering the preference information of the first user, and
second transmitting means for transmitting, to the second user apparatus if the second user apparatus is the destination device, notification of the registering of the preference information of the first user;
the second user apparatus including:
first receiving means for receiving the notification of the registering of the preference information of the first user from the server apparatus, and
access means for accessing the server;
the server apparatus including:
determining means for determining, in response to the access by the second user apparatus, whether the second user apparatus is designated to receive preference information,
the second transmitting means transmitting to the second user apparatus, in response to the determining means determining that the second user apparatus is designated to receive preference information, a list of trusting users that trust the second user apparatus, the list including the first user;
the second user apparatus including:
third receiving means for receiving the list of trusting users,
selecting means for selecting a trusting user from the list of trusting users, and
third transmitting means for transmitting, to the server apparatus, designation information designating that the preference information of the selected trusting user is to be received; and
the server apparatus including:
the second receiving means receiving the designation information sent by the second user apparatus,
the second transmitting means sending the registered preference information of the selected trusting user to the second user apparatus in response to receiving the designation information from the second user apparatus, and when the first user is the selected trusting user, the first receiving means of the second user apparatus thereby receiving, from the server apparatus, the registered preference information of the first user.

2. An information processing method for an information processing system including a first user apparatus, a second user apparatus operable to exchange information with the first user apparatus and a server apparatus operable to control information exchange between the first user apparatus and the second user apparatus, the first, second and server apparatuses being connected to a network, the information processing method comprising:
acquiring, at the first user apparatus from program guide information, information about a to-be-provided program based on a user input provided by a first user to the first user apparatus;
extracting, at the first user apparatus, preference information of the first user from the information about the to-be-provided program, the preference information including a plurality of preference keywords associated with the to-be-provided program;
sending the preference information of the first user and a destination to which the preference information is to be provided from the first user apparatus to the server apparatus;
registering, in the server apparatus, the preference information sent from the first user apparatus;
sending, from the server apparatus to the second user apparatus if the second user apparatus is the destination device, notification of the registering of the preference information of the first user apparatus;
receiving, in the second user apparatus from the third information processing server apparatus, the notification of the registering of the preference information of the first user apparatus;
accessing, by the second user apparatus, the server;
determining, at the server apparatus in response to the access by the second user apparatus, whether the second user apparatus is designated to receive preference information;
transmitting to the second user apparatus, in response to determining that the second user apparatus is designated to receive preference information, a list of trusting users that trust the second user apparatus, the list including the first user;
receiving, at the second user apparatus, the list of trusting users;
selecting, at the second user apparatus, a trusting user from the list of trusting users
transmitting, from the second user apparatus to the server apparatus, designation information designating that the preference information of the selected trusting user apparatus is to be received;
receiving, at the server apparatus, the preference designation information of the selected trusting user;
sending, from the server apparatus to the second user apparatus, the registered preference information of the selected trusting user in response to the server apparatus receiving the designation information from the second user apparatus; and
receiving, at the second user apparatus from the server apparatus, the registered preference information of the selected trusting user, and
when the first user is the selected trusting user, the second user apparatus thereby receiving, from the server apparatus, the registered preference information of the first user.

3. The information processing system according to claim 1, wherein the first transmitting means sends the preference keyword information and the destination information to the server apparatus, registers the preference keyword information with the server apparatus, and causes the server apparatus to provide the preference keyword information to a user apparatus defined by the destination information.

4. The information processing system according to claim 1, the first user apparatus includes input means for receiving a user operation representing a user preference for a predetermined program.

5. The information processing system according to claim 1, wherein the user operation is an operation to schedule recording or protection of the predetermined program.

6. The information processing system according to claim 1, wherein the acquiring means further acquires one or more of a preference genre, an airing time zone, and a broadcast station from the program guide information of the predetermined program based upon the user operation.

7. The information processing system according to claim 1, wherein the first user apparatus includes further receiving means for receiving the program guide information from a broadcast station through a broadcast radio wave or from a server.

8. The information processing system according to claim 1, wherein the acquiring means acquires destination information specifying a plurality of destination devices.

9. A predetermined information processing apparatus connected to a network together with a first user apparatus and a second user apparatus operable to exchange information with the first user apparatus, the predetermined information processing apparatus being operable to control information exchange between the first user apparatus and the second user apparatus, the predetermined information processing apparatus comprising:
   first accepting means for accepting an access by the first user apparatus;
   first receiving means for receiving, from the first user apparatus, preference information of a first user and destination information specifying a destination device to which the preference information of the first user is to be provided, the preference information of the first user including a plurality of preference keywords associated with a to-be-provided program;
   registering means for registering the preference information of the first user and the destination information;
   determining means for determining whether the second user apparatus is the destination device;
   first transmitting means for sending, to the second user apparatus if the determining means has determined that the second user apparatus is the destination device, notification of the registering of the preference information of the first user;
   second accepting means for accepting an access by the second user apparatus;
   determining means for determining, in response to the access by the second user apparatus, whether the second user apparatus is designated to receive preference information;
   second transmitting means for transmitting to the second user apparatus, in response to the determining means determining that the second user apparatus is designated to receive preference information, a list of trusting users that trust the second user apparatus, the list including the first user;
   third means for receiving, from the second user apparatus, designation information designating that the preference information of a selected trusting user from the list of trusting users is to be received by the second user apparatus; and
   second transmitting means for sending, to the second user apparatus in response to receiving the designation information from the second user apparatus, the registered preference information of the selected trusting user, and
   when the first user is the selected trusting user, the second user apparatus thereby receiving, from the server apparatus, the registered preference information of the first user.

10. An information processing method for a predetermined information processing apparatus connected to a network together with a first user apparatus and a second user apparatus operable to exchange information with the first user apparatus, the predetermined information processing apparatus being operable to control information exchange between the first user apparatus and the second user apparatus, the information processing method comprising:
   accepting an access by the first user apparatus;
   receiving, from the first user apparatus, preference information of a first user and destination information specifying a destination device to which the preference information of the first user is to be provided, the preference information of the first user including a plurality of preference keywords associated with a to-be-provided program;
   registering the preference information of the first user and the destination information;
   accepting an access by the second user apparatus;
   determining whether the second user apparatus is the destination device; and
   sending, to the second user apparatus if the determining step has determined that the second user apparatus is the destination device, notification of the registering of the preference information of the first user apparatus;
   accepting an access by the second user apparatus;
   determining, in response to the access by the second user apparatus, whether the second user apparatus is designated to receive preference information;
   transmitting to the second user apparatus, in response to determining that the second user apparatus is designated to receive preference information, a list of trusting users that trust the second user apparatus, the list including the first user;
   receiving, from the second user apparatus, designation information designating that the preference information of a selected trusting user from the list of trusting users is to be received by the second user apparatus; and
   sending, to the second user apparatus in response to receiving the designation information from the second user apparatus, the registered preference information of the selected trusting user, and
   when the first user is the selected trusting user, the second user apparatus thereby receiving, from the server apparatus, the registered preference information of the first user.

11. A non-transitory recording medium recorded with a computer-readable program for causing a predetermined information processing apparatus to execute an information processing method, the predetermined information processing apparatus being connected to a network together with a first user apparatus and a second user apparatus operable to exchange information with the first user apparatus, the predetermined information processing apparatus being operable to control information exchange between the first user apparatus and the second user apparatus, the information processing method comprising:

- accepting an access by the first user apparatus;
- receiving, from the first user apparatus, preference information of a first user and destination information specifying a destination device to which the preference information of the first user is to be provided, the preference information of the first user including a plurality of preference keywords associated with a to-be-provided program;
- registering the preference information of the first user and the destination information;
- accepting an access by the second user apparatus;
- determining whether the second user apparatus is the destination device; and
- sending, to the second user apparatus if the determining step has determined that the second user apparatus is the destination device, notification of the registering of the preference information of the first user apparatus;
- accepting an access by the second user apparatus;
- determining, in response to the access by the second user apparatus, whether the second user apparatus is designated to receive preference information;
- transmitting to the second user apparatus, in response to determining that the second user apparatus is designated to receive preference information, a list of trusting users that trust the second user apparatus, the list including the first user;
- receiving, from the second user apparatus, designation information designating that the preference information of a selected trusting user from the list of trusting users is to be received by the second user apparatus; and
- sending, to the second user apparatus in response to receiving the designation information from the second user apparatus, the registered preference information of the selected trusting user, and
- when the first user is the selected trusting user, the second user apparatus thereby receiving, from the server apparatus, the registered preference information of the first user.

12. An information processing system, comprising:

a first user apparatus;
a second user apparatus operable to exchange information with the first user apparatus; and
a server apparatus operable to control information exchange between the first user apparatus and the second user apparatus;
the first user apparatus, the second user apparatus, and the server apparatus each being connected to a network;
the first user apparatus including:
- an acquiring unit operable to acquire, from program guide information, information about a to-be-provided program based on a user input provided by a first user to the first user apparatus, and to extract preference information of the first user from the information about the to-be-provided program, the preference information including a plurality of preference keywords associated with the to-be-provided program,
- a first transmitter operable to send, to the server apparatus, the preference information of the first user and a destination device to which the preference information of the first user is to be provided;
the server apparatus including:
- a registering unit operable to register the preference information of the first user, and
- a second transmitter operable to transmit, to the second user apparatus if the second user apparatus is the destination device, notification of the registering of the preference information of the first user;
the second user apparatus including:
- a first receiver operable to receive the notification of the registering of the preference information of the first user from the server apparatus, and
- an access unit operable to access the server;
the server apparatus including:
- a determining unit operable to, in response to the access by the second user apparatus, whether the second user apparatus is designated to receive preference information,
- the second transmitter being operable to transmit to the second user apparatus, in response to the determining unit determining that the second user apparatus is designated to receive preference information, a list of trusting users that trust the second user apparatus, the list including the first user;
the second user apparatus including:
- a third receiver operable to receive the list of trusting users,
- a selecting unit operable to select a trusting user from the list of trusting users, and
- a third transmitter operable to transmit, to the server apparatus, designation information designating that the preference information of the selected trusting user is to be received; and
the server apparatus including:
- the second receiver being operable to receive the designation information sent by the second user apparatus, and
- the second transmitter being operable to send the registered preference information of the selected trusting user to the second user apparatus in response to receiving the designation information from the second user apparatus,
- the first receiver of the second user apparatus being operable to receive, from the server apparatus, the registered preference information of the selected trusting user, and
- when the first user is the selected trusting user, the first receiver means of the second user apparatus thereby being operable to receive, from the server apparatus, the registered preference information of the first user.

13. A predetermined information processing apparatus connected to a network together with a first user apparatus and a second user apparatus operable to exchange information with the first user apparatus, the predetermined information processing apparatus being operable to control information exchange between the first user apparatus and the second user apparatus, the predetermined information processing apparatus comprising:

- a first accepting unit operable to accept an access by the first user apparatus;
- a receiver operable to receive, from the first user apparatus, preference information of a first user and destination information specifying a destination device to which the preference information of the first user is to be provided, the preference information of the first user including a plurality of preference keywords associated with a to-be-provided program;
- a registering unit operable to register the preference information of the first user and the destination information;
- a first determining unit operable to determine whether the second user apparatus is the destination device;

a first transmitter operable to send, to the second user apparatus if the determining unit has determined that the second user apparatus is the destination device, notification of the registering of the preference information of the first user;

a second accepting unit operable to accept an access by the second user apparatus;

a second determining unit operable to determine, in response to the access by the second user apparatus, whether the second user apparatus is designated to receive preference information;

second transmitter operable to transmit to the second user apparatus, in response to the second determining unit determining that the second user apparatus is designated to receive preference information, a list of trusting users that trust the second user apparatus, the list including the first user;

a third receiver operable to receive, from the second user apparatus, designation information designating that the preference information of a selected trusting user from the list of trusting users user is to be received by the second user apparatus; and second transmitting transmitter operable to send, to the second user apparatus in response to receiving the designation information from the second user apparatus, the registered preference information of the selected trusting user, and when the first user is the selected trusting user, the second user apparatus thereby receiving, from the server apparatus, the registered preference information of the first user.

14. The information processing system according to claim 12, wherein the first transmitter is operable to send the preference keyword information and the destination information to the server apparatus, register the preference keyword information with the server apparatus, and cause the server apparatus to provide the preference keyword information to a user apparatus defined by the destination information.

15. The information processing system according to claim 12, wherein the first user apparatus includes an input unit operable to receive a user operation representing a user preference for a predetermined program.

16. The information processing system according to claim 12, wherein the user operation is an operation to schedule recording or protection of the predetermined program.

17. The information processing system according to claim 12, wherein the acquiring unit is operable to acquire one or more of a preference genre, an airing time zone, and a broadcast station from the program guide information of the predetermined program based upon the user operation.

18. The information processing system according to claim 12, wherein the first user apparatus includes a further receiving unit operable to receive the program guide information from a broadcast station through a broadcast radio wave or from a server.

19. The information processing system according to claim 12, wherein the acquiring unit is operable to acquire destination information specifying a plurality of destination devices.

20. The information processing system according to claim 1, wherein the plurality of preference keywords is respectively associated with a plurality of numerical point values each of which indicates a degree of the first user liking or disliking of its associated preference keyword relative to other ones of the preference keywords and which has a value greater than zero to indicate the first user liking the associated preference keyword and a value less than zero to indicate the first user disliking the associated preference keyword.

21. The information processing method according to claim 2, wherein the plurality of preference keywords is respectively associated with a plurality of numerical point values each of which indicates a degree of the first user liking or disliking of its associated preference keyword relative to other ones of the preference keywords and which has a value greater than zero to indicate the first user liking the associated preference keyword and a value less than zero to indicate the first user disliking the associated preference keyword.

22. The predetermined information processing apparatus according to claim 9, wherein the plurality of preference keywords is respectively associated with a plurality of numerical point values each of which indicates a degree of the first user liking or disliking of its associated preference keyword relative to other ones of the preference keywords and which has a value greater than zero to indicate the first user liking the associated preference keyword and a value less than zero to indicate the first user disliking the associated preference keyword.

23. The information processing method according to claim 10, wherein the plurality of preference keywords is respectively associated with a plurality of numerical point values each of which indicates a degree of the first user liking or disliking of its associated preference keyword relative to other ones of the preference keywords and which has a value greater than zero to indicate the first user liking the associated preference keyword and a value less than zero to indicate the first user disliking the associated preference keyword.

24. The non-transitory recording medium according to claim 11, wherein the plurality of preference keywords is respectively associated with a plurality of numerical point values each of which indicates a degree of the first user liking or disliking of its associated preference keyword relative to other ones of the preference keywords and which has a value greater than zero to indicate the first user liking the associated preference keyword and a value less than zero to indicate the first user disliking the associated preference keyword.

25. The information processing system according to claim 12, wherein the plurality of preference keywords is respectively associated with a plurality of numerical point values each of which indicates a degree of the first user liking or disliking of its associated preference keyword relative to other ones of the preference keywords and which has a value greater than zero to indicate the first user liking the associated preference keyword and a value less than zero to indicate the first user disliking the associated preference keyword.

26. The predetermined information processing apparatus according to claim 13, wherein the plurality of preference keywords is respectively associated with a plurality of numerical point values each of which indicates a degree of the first user liking or disliking of its associated preference keyword relative to other ones of the preference keywords and which has a value greater than zero to indicate the first user liking the associated preference keyword and a value less than zero to indicate the first user disliking the associated preference keyword.

* * * * *